US012779410B2

(12) United States Patent
Erhard et al.

(10) Patent No.: US 12,779,410 B2
(45) Date of Patent: Nov. 3, 2026

(54) APPARATUS AND METHOD FOR OPERATING A STATIC MIXING DEVICE

(71) Applicant: Ieon-nanodrugs GmbH, Planegg (DE)

(72) Inventors: Martin Erhard, Planegg (DE); Charlie Lowndes, Ickleton (GB); Oliver Harvey, Ickleton (GB)

(73) Assignee: leon-nanodrugs GmbH, Planegg (DE)

( * ) Notice: Subject to any disclaimer, the term of this patent is extended or adjusted under 35 U.S.C. 154(b) by 0 days.

(21) Appl. No.: 18/878,305

(22) PCT Filed: Oct. 2, 2023

(86) PCT No.: PCT/EP2023/077273

§ 371 (c)(1),
(2) Date: Dec. 23, 2024

(87) PCT Pub. No.: WO2024/069014

PCT Pub. Date: Apr. 4, 2024

(65) Prior Publication Data

US 2025/0381532 A1 Dec. 18, 2025

(30) Foreign Application Priority Data

Sep. 30, 2022 (EP) .................................... 22199253
May 3, 2023 (EP) .................................... 23171361
Jul. 25, 2023 (EP) .................................... 23187456

(51) Int. Cl.
*B01F 25/23* (2022.01)
*B01F 25/40* (2022.01)
(Continued)

(52) U.S. Cl.
CPC .............. *B01F 25/23* (2022.01); *B01F 25/40* (2022.01); *B01F 35/2201* (2022.01); *B01F 35/71745* (2022.01); *B01F 35/71795* (2022.01)

(58) Field of Classification Search
CPC ........... B29B 7/242; B29B 7/86; B29B 7/244; B29B 7/283; B29B 7/16; B01F 35/8821;
(Continued)

(56) References Cited

U.S. PATENT DOCUMENTS 902,858 A 11/1908 Cooke et al.
1,806,801 A 5/1931 Higgins et al.
(Continued)

FOREIGN PATENT DOCUMENTS

CN 108325493 A 7/2018
DE 102016213000 A1 1/2018
(Continued)

OTHER PUBLICATIONS

Extended European Search Report issued in EP21206216.0, Apr. 28, 2022, 9 pages.
(Continued)

*Primary Examiner* — Charles Cooley
(74) *Attorney, Agent, or Firm* — Synergy IP Group AG; Lily Ackerman

(57) ABSTRACT

An apparatus for mixing two liquids is provided. The apparatus includes a static mixer, and a first and second feed module for feeding the two liquids to the mixer. The feed modules include pressurizable chambers for accommodating flexible containers which hold the liquids to be mixed. The liquids are forced through the static mixer when the chambers including the flexible containers are pressurized. Pressurization is achieved by pressurized gas stored in pressure reservoir chambers that are connectable to the chambers holding the flexible containers. Related methods of mixing two liquids are also provided.

20 Claims, 8 Drawing Sheets

(51) Int. Cl.
*B01F 35/22* (2022.01)
*B01F 35/71* (2022.01)

(58) Field of Classification Search
CPC .............. B01F 2101/2805; B01F 31/40; B01F 35/7176; B01F 25/23; B01F 25/40; B01F 35/2201; B01F 35/71745; B01F 35/71795; B01F 35/2207; B01F 23/405; B01F 23/45; B01F 31/55; B01F 35/2113; B01F 35/2213; B01F 2101/2202; G05D 11/133
USPC ........................................................ 366/160.2
See application file for complete search history.

(56) References Cited

U.S. PATENT DOCUMENTS

| | | | | |
|---|---|---|---|---|
| 3,306,587 | A | 2/1967 | Schroedter | |
| 5,061,446 | A | 10/1991 | Guigan | |
| 5,186,905 | A | 2/1993 | Bertram et al. | |
| 5,318,702 | A | 6/1994 | Ashbrook | |
| 7,563,019 | B2 | 7/2009 | Buchholz | |
| 7,784,997 | B2 | 8/2010 | Neumann | |
| 11,298,673 | B2 | 4/2022 | Walter et al. | |
| 11,745,388 | B2 * | 9/2023 | Lautt | B01F 35/7176 366/162.1 |
| 2006/0109738 | A1 | 5/2006 | Buchholz | |
| 2006/0166233 | A1 | 7/2006 | Wu et al. | |
| 2009/0269250 | A1 | 10/2009 | Panagiotou et al. | |
| 2013/0221141 | A1 | 8/2013 | Zhang et al. | |
| 2014/0044847 | A1 | 2/2014 | Hellmaier | |
| 2016/0187764 | A1 | 6/2016 | Tobita | |
| 2017/0361299 | A1 | 12/2017 | Brunelli et al. | |
| 2018/0237285 | A1 | 8/2018 | Tom et al. | |
| 2020/0156038 | A1 | 5/2020 | Walter et al. | |
| 2021/0122085 | A1 * | 4/2021 | Lautt | B29B 7/242 |
| 2022/0118414 | A1 | 4/2022 | Zhu et al. | |
| 2022/0143280 | A1 | 5/2022 | Ageishi et al. | |
| 2022/0143620 | A1 | 5/2022 | West et al. | |
| 2023/0219044 | A1 | 7/2023 | Mittal et al. | |
| 2024/0269644 | A1 | 8/2024 | Stieneker | |
| 2025/0381532 | A1 * | 12/2025 | Erhard | B01F 25/23 |
| 2025/0381549 | A1 | 12/2025 | Stieneker et al. | |
| 2026/0001052 | A1 * | 1/2026 | Stieneker | B01F 25/23 |
| 2026/0151746 | A1 | 6/2026 | Stieneker | |

FOREIGN PATENT DOCUMENTS

| | | | | | |
|---|---|---|---|---|---|
| EP | 1165224 | B1 | | 9/2002 | |
| EP | 1146959 | B1 | | 6/2008 | |
| EP | 2133149 | A1 | | 12/2009 | |
| EP | 3939630 | A1 | | 1/2022 | |
| EP | 21192535.9 | | | 3/2023 | |
| WO | 9110615 | A1 | | 7/1991 | |
| WO | 2006005401 | A2 | | 1/2006 | |
| WO | 2009076276 | A2 | | 6/2009 | |
| WO | 2010008396 | A2 | | 1/2010 | |
| WO | 2018065109 | A1 | | 4/2018 | |
| WO | 2018234217 | A1 | | 12/2018 | |
| WO | 2019246615 | A1 | | 12/2019 | |
| WO | 2021035831 | A1 | | 3/2021 | |
| WO | 2021252715 | A1 | | 12/2021 | |
| WO | 2023025736 | A1 | | 3/2023 | |
| WO | 2023079039 | A1 | | 5/2023 | |
| WO | WO-2024069012 | A1 | * | 4/2024 | B01F 35/71795 |
| WO | WO-2024069014 | A1 | * | 4/2024 | B01F 35/2201 |

OTHER PUBLICATIONS

International Search Report and Written Opinion issued in PCT/EP2023/075054, Dec. 19, 2023, 16 pages.

International Search Report and Written Opinion issued in PCT/EP2022/080743, Feb. 21, 2023, 20 pages.

International Search Report and Written Opinion issued in PCT/EP2023/077266, Feb. 5, 2024, 18 pages.

International Search Report and Written Opinion issued in PCT/EP2023/077273, Feb. 7, 2024, 18 pages.

Extended European Search Report issued in EP22195145.2, Mar. 2, 2023, 10 pages.

Extended European Search Report issued in EP22199253.0, Mar. 31, 2023, 10 pages.

International Search Report and Written Opinion of International Application PCT/EP2022/073361, Nov. 30, 2022, 22 pages.

* cited by examiner

APPARATUS AND METHOD FOR OPERATING A STATIC MIXING DEVICE

CROSS-REFERENCE TO RELATED APPLICATIONS

This application is a national stage entry according to 35 U.S.C. § 371 of PCT Application No. PCT/EP2023/077273 filed on Oct. 2, 2023, which claims priority to EP 22199253.0 filed on Sep. 30, 2022; EP 23171361.1 filed on May 3, 2023; and EP 23187456.1 filed on Jul. 25, 2023, which are entirely incorporated herein by reference.

BACKGROUND

Process automation as well as up- and downscaling of mixing processes are tasks regularly dealt with in various fields of biotechnology and medicine.

Systems for the production of mixed fluids or products based on combination of two or more components may utilize a source of liquid raw material, supply lines, a chamber in which the mixing or reaction takes place and an outlet for harvesting the product. The chamber often represents the heart of such systems and can for example be bulky, like e.g. containers, or miniaturized, like in microfluidic approaches. However, setup of the system, conditions and the quality of the raw material also plays a decisive role in these processes.

One example of a discontinuous mixing system is the apparatus for mixing, storing and homogenizing liquids as discussed in U.S. Pat. No. 7,784,997B2. It includes a rigid container fitted with a non-invasive pump. The container encloses a single-use bag that has an orifice at the lower face used as an outlet for the liquid and further orifices on the top of the bag for the addition of various liquids in order to produce a mixture. One of the upper orifices is used for the liquid to return to the inside of the bag (with help of the pump) enabling a closed-circuit circulation. The system is intended for single-use and prevents the cleaning and sterilization steps that are necessary when rigid tanks are used for the mixing. It is able to handle bags with a volume of 25 to 3000 l but is does not appear to be suitable for the production of small amount, like e.g. µl- or ml amounts.

EP1146959B1 discusses an apparatus for the continuous production of encapsulated therapeutic compounds that gives an example for a precisely controlled metering system. The apparatus includes a lipid phase storage means and an aqueous phase storage means, a pressurized transfer means for transferring the phases to a mixing device that may be a static mixer. The apparatus of EP1146959B1 additionally includes a pre-mixing system. The phases are transported from the means to the pre-mixing and mixing chamber with help of metering pumps driven by a motor. Since this system is a continuous system, it is able to produce higher amounts of the desired product.

Despite these and other solutions to mixing systems and methods, the need for methods and apparatuses for the production of small quantities of products which are fast, reliable and can be performed under standardized conditions is not fully met. This is especially true for applications in the field of personalized medicine.

It is thus an object of the present disclosure to provide apparatuses and methods for the production of mixed fluids or products based on combination of two or more components that are flexible in terms of adaptation to different kind of products as well as robust, fast and reliably producing the desired product. They also aim at providing a high-throughput approach. Further objects of the disclosure will be clear on the basis of the following description, examples, and claims.

SUMMARY

In a first aspect of the disclosure, an apparatus for operating a static mixer for mixing a first liquid and a second liquid is provided, said static mixer including a first inlet for receiving the first liquid, a second inlet for receiving the second liquid, and an outlet for discharging a third liquid that results from mixing the first liquid and the second liquid. Moreover, the apparatus includes (a) a first feed module for providing the first liquid to the first inlet; (b) a second feed module for providing the second liquid to the second inlet; and (c) a pressure supply module arranged upstream of the first and the second feed module. Each of the first and the second feed module independently includes: (i) a pressure reservoir chamber for holding a pressurized gas, said pressure reservoir chamber having an inlet and/or an outlet for pressurized gas; (ii) a pressurizable substrate chamber for holding a flexible container, said flexible container having an interior space for holding the first liquid or the second liquid, respectively; (iii) a connector for providing fluid communication between the pressure reservoir chamber and the pressurizable substrate chamber, wherein said fluid communication is for permitting a flow of pressurized gas from the pressure reservoir chamber to the pressurizable substrate chamber; (iv) a means for reversibly interrupting the fluid communication between the pressure reservoir chamber and the pressurizable substrate chamber, said means having an open state and a closed state; wherein the connector and said means are arranged for achieving immediate pressure equilibration between the pressure reservoir chamber and the pressurizable substrate chamber upon changing the state of said means from closed to open; and (v) a pressure sensor for measuring the pressure of the pressurized gas in the feed module at or downstream of the pressure reservoir chamber. The pressure supply module includes (i) a gas inlet which is reversibly connectable to a source of pressurized gas; (ii) a first gas outlet for supplying pressurized gas to the pressure reservoir chamber of the first feed module; (iii) a second gas outlet for supplying pressurized gas to the pressure reservoir chamber of the second feed module, (iv) a flow path for pressurized gas to flow from the gas inlet to the first and/or second gas outlet, said flow path including a flow path divider; (v) at least one pressure amplifier arranged in the flow path; (vi) a first pressure control circuit adapted to control the pressure of the pressurized gas delivered to the pressure reservoir chamber of first feed module; and (vii) a second pressure control circuit adapted to control the pressure of the pressurized gas delivered to the pressure reservoir chamber of the second feed module. Further features of the apparatus are provided below in the detailed description.

According to another aspect of the disclosure, an apparatus for mixing a first and a second liquid is provided which includes a static mixer and a first and a second feed module which are adapted for providing the first and the second liquid to the static mixer. The feed modules are characterized in that each of them independently includes: a substrate chamber for holding a flexible container having an interior space for holding the first liquid or the second liquid, respectively; a conduit for providing fluid communication between the interior space of the flexible container and the first or the second inlet of the static mixer, respectively; a pressure reservoir chamber for holding a pressurized gas, the pressure reservoir chamber having an inlet and an outlet for pressurized gas; a pressure amplifier arranged upstream of the pressure reservoir chamber, said pressure amplifier including an inlet which is reversibly connectable to a source of pressurized gas, and an outlet for pressurized gas which is in fluid connection with the inlet of the pressure reservoir chamber; a connector for providing fluid communication between the pressure reservoir chamber and the substrate chamber. The connector includes a means for reversibly interrupting the fluid communication between the pressure reservoir chamber and the substrate chamber, wherein the means has an open state and a closed state, and wherein said fluid communication is for permitting a flow of pressurized gas from the pressure reservoir chamber to the substrate chamber such as to exert pressure on an external surface of the flexible container and to force the first or second liquid from the container into the conduit. Moreover, the connector and said means are arranged for achieving immediate pressure equilibration between the pressure reservoir chamber and the substrate chamber upon changing the state of said means from closed to open.

In a further aspect, the disclosure provides a method of mixing a first liquid and a second liquid. The method including the steps of (aa) providing a first flexible container holding the first liquid, said first flexible container being housed in a first pressurizable substrate chamber; (bb) providing a second flexible container holding the second liquid, said second flexible container being housed in a second pressurizable substrate chamber; (cc) providing a static mixer having a first inlet for receiving the first liquid, a second inlet for receiving the second liquid, and an outlet for discharging a third liquid that results from mixing the first liquid and the second liquid; (dd) pressurizing the first and the second pressurizable substrate chamber independently by means of a pressurized gas which exerts pressure on an external surface of the first and the second flexible container such as to force said first and said second liquid through the static mixer such as to mix said first and said second liquid; and (ee) collecting the third liquid. Further features of the method are provided below in the detailed description.

In a yet further aspect, the disclosure provides a method of mixing a first liquid and a second liquid based on the use of the apparatus. In particular, the method includes the steps of: (aa) providing a first flexible container holding the first liquid, said first flexible container being housed in a first pressurizable substrate chamber; (bb) providing a second flexible container holding the second liquid, said second flexible container being housed in a second pressurizable substrate chamber; (cc) providing a static mixer having a first inlet for receiving the first liquid, a second inlet for receiving the second liquid, and an outlet for discharging a third liquid that results from mixing the first liquid and the second liquid; (dd) pressurizing the first and the second pressurizable substrate chamber independently by means of a pressurized gas which exerts pressure on an external surface of the first and the second flexible container such as to force said first and said second liquid through the static mixer such as to mix said first and said second liquid; and (ee) collecting the third liquid. Further features and non-limiting embodiments of the method are disclosed in the detailed description.

DETAILED DESCRIPTION

Figure 1:
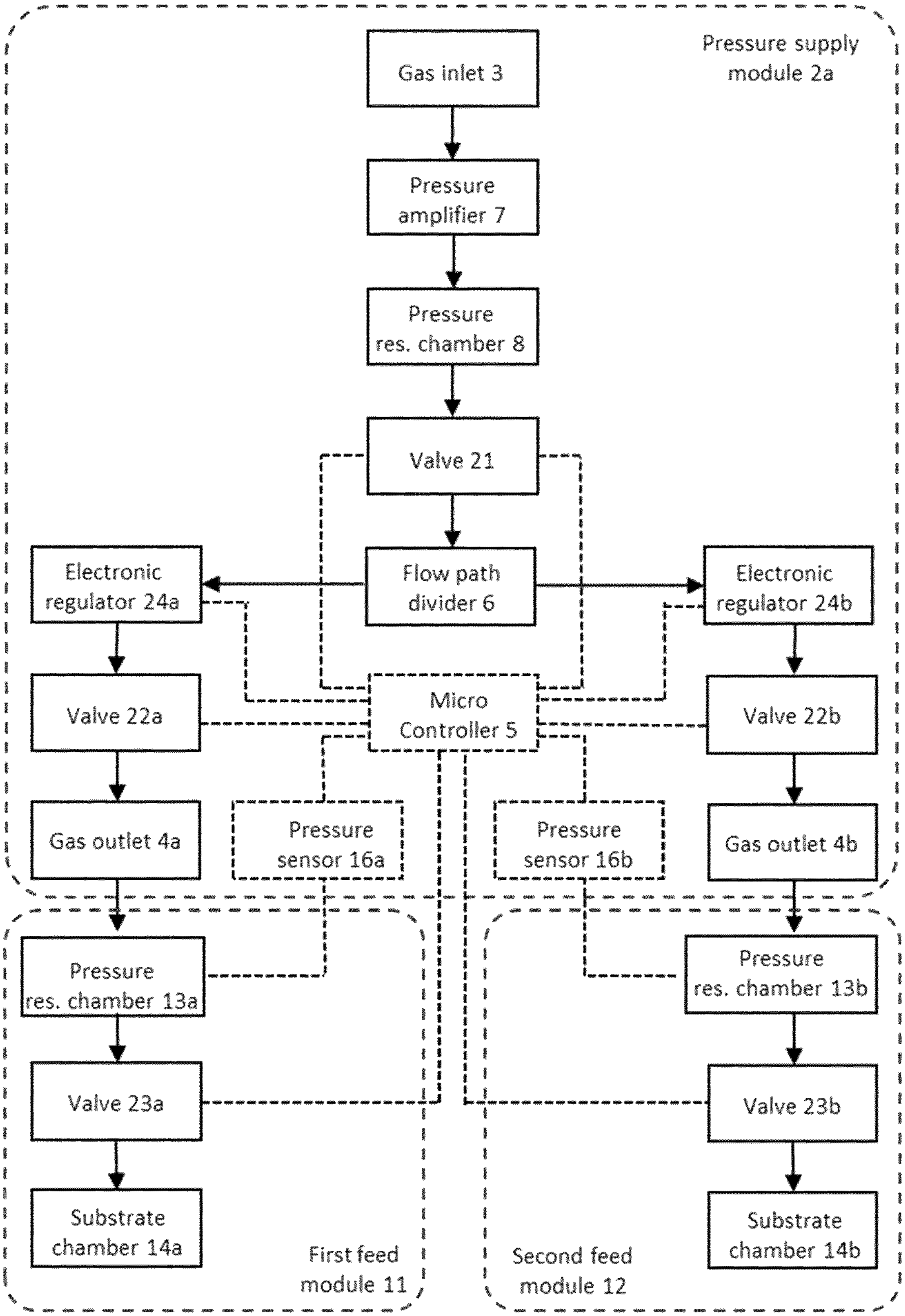
FIG. 1 is a flow chart depicting the pneumatic circuitry and components of a non-limiting embodiment of the apparatus (1).

As mentioned in the summary, a first aspect of the disclosure relates to an apparatus for operating a static mixer for mixing a first liquid and a second liquid, said static mixer including a first inlet for receiving the first liquid, a second inlet for receiving the second liquid, and an outlet for discharging a third liquid that results from mixing the first liquid and the second liquid. Moreover, the apparatus includes (a) a first feed module for providing the first liquid to the first inlet; (b) a second feed module for providing the second liquid to the second inlet; and (c) a pressure supply module arranged upstream of the first and the second feed module. Each of the first and the second feed module independently includes: (i) a pressure reservoir chamber for holding a pressurized gas, said pressure reservoir chamber having an inlet and/or an outlet for pressurized gas; (ii) a pressurizable substrate chamber for holding a flexible container, said flexible container having an interior space for holding the first liquid or the second liquid, respectively; (iii) a connector for providing fluid communication between the pressure reservoir chamber and the pressurizable substrate chamber, wherein said fluid communication is for permitting a flow of pressurized gas from the pressure reservoir chamber to the pressurizable substrate chamber; (iv) a means for reversibly interrupting the fluid communication between the pressure reservoir chamber and the pressurizable substrate chamber, said means having an open state and a closed state; wherein the connector and said means are arranged for achieving immediate pressure equilibration between the pressure reservoir chamber and the pressurizable substrate chamber upon changing the state of said means from closed to open; and (v) a pressure sensor for measuring the pressure of the pressurized gas in the feed module at or downstream of the pressure reservoir chamber. The pressure supply module includes (i) a gas inlet which is reversibly connectable to a source of pressurized gas; (ii) a first gas outlet for supplying pressurized gas to the pressure reservoir chamber of the first feed module; (iii) a second gas outlet for supplying pressurized gas to the pressure reservoir chamber of the second feed module, (iv) a flow path for pressurized gas to flow from the gas inlet to the first and/or second gas outlet, said flow path including a flow path divider; (v) at least one pressure amplifier arranged in the flow path; (vi) a first pressure control circuit adapted to control the pressure of the pressurized gas delivered to the pressure reservoir chamber of first feed module; and (vii) a second pressure control circuit adapted to control the pressure of the pressurized gas delivered to the pressure reservoir chamber of the second feed module.

The apparatus as defined herein is surprisingly precise in controlling the flow of the first and second liquid into the static mixer at predetermined flow rates, and allows the highly reproducible processing of the two liquid substrates into a product, i.e. the third liquid composition. Moreover, it allows the aseptic processing of very small batches, and it avoids the dead volumes and ramp-up losses of larger-scale equipment for generating liquid streams, in particular equipment using pumps and other flow- or pressure control systems. The use of gas pressure exerted on an external surface of a flexible container as a driving force for achieving a controlled flow of liquids from such flexible containers into a static mixer also avoids the initial fluid pressure oscillations that are associated with the use of pumps. This effect makes the claimed apparatus and process particularly useful for the preparation of small batches and for short processing times. This is particularly true for gas pressure that is provided abruptly by a pre-pressurized pressure reservoir chamber rather than a continuous flow of a pressurized gas. It has been found that the rapid equilibration of pressure exerted on the external surface of the flexible container provides for minimal ramp-up times to reach required processing flow rates, improving efficiency with respect to loss of substrate and minimizing the amount of liquid product streams formed under non-optimal mixing flows during ramp-up. Moreover, as the pressurized gas does not get into contact with the liquid but rather with the exterior surface of the flexible container, it cannot contaminate the liquid.

In view of the absence of pumps and other peripheral hardware, the apparatus can be designed to be operated with disposable static mixers and fluid conduits, thus avoiding lengthy cleaning and sterilization cycles.

As used herein, an apparatus for operating a static mixer should be understood as an apparatus that is technically suitable and actually adapted or configured for operating a static mixer. Likewise, a static mixer for mixing a first liquid and a second liquid means a static mixer that is suitable and adapted for mixing a first liquid and a second liquid.

In the context of the disclosure, a static mixer is any mixer or mixing device that does not rely on moving parts for performing a mixing process. An example of a very simple static mixing device is a T-piece. As a static mixing device is for mixing two liquids such as to generate a liquid mixture, i.e., a third liquid, it typically includes at least two substrate inlets and a product outlet. These substrate inlets are in the context of the disclosure referred to as the first inlet for receiving the first liquid and the second inlet for receiving the second liquid.

A feed module, as used herein, should be understood as a group of apparatus components that are designed, adapted and/or configured to cause a substrate to be fed to the static mixer. According to the disclosure, the apparatus includes at least two feed modules: a first one to provide the first liquid to the first inlet of the static mixer, and a second one to provide the second liquid to the second inlet. A principal aspect that characterizes the present disclosure is the design and configuration of these feed modules. More specifically, the feed modules are adapted to accommodate flexible containers in which the liquid substrates are initially provided and from which these are fed into the mixing device. As used herein, a flexible container means any container capable of holding a liquid material that has at least one flexible wall. In particular, the container exhibits a type of flexibility by which the internal volume or interior space of the container may be significantly reduced, as is the case of collapsible containers where the collapsibility results from the flexibility of the container wall(s), similar to infusion bags.

Each of the two feed modules independently includes a pressure reservoir chamber. Such pressure reservoir chamber is a designed and adapted to hold a pressurized gas, such as pressurized air. As such, it typically includes a solid, pressure-resistant wall enclosing an internal space for holding the pressurized gas. The degree of pressure resistance of the wall should be selected in view of the intended operating pressure. For example, the pressure reservoir chambers may be designed to operate at a pressure of up to about 50 bar, or up to about 25 bar. In order to be filled with pressurized gas and to deliver the pressurized gas to the pressurizable substrate chamber, the pressure reservoir chamber exhibits at least one opening which represents the inlet and the outlet. The inlet and the outlet for pressurized gas may be independent or distinct from one another.

Moreover, each of the two feed modules independently includes a pressurizable substrate chamber for holding a flexible container holding the first or second liquid. For operating the apparatus and mixing the two liquids, the substrate chambers are pressurized to discharge—e.g. squeeze—the liquids out of the flexible containers and to feed the liquids to the mixing device. The pressurization is achieved by pressurized gas which is initially contained in the pressure reservoir chamber of each feed module, and which is allowed to flow into the substrate chambers such as to exert pressure on an external surface of the flexible container for starting the mixing process.

As mentioned, the pressurizable substrate chambers are adapted for holding a flexible container including the first or second liquid. In order to facilitate the insertion and/or removal of such flexible container, the substrate chamber of the first or the second feed module may include a means for it to be opened and closed. Both the substrate chambers may exhibit this feature. For example, the pressurizable substrate chambers may include a two-piece wall or housing, e.g., a main part and a lid-like part, and a means for affixing the lid to the main part in a gas-tight manner.

Independently, as used in this context, means that the respective feed module component is present in each of the first and the second feed module, and that a component of the first feed module may differ with respect to its features or dimensions from the respective component of the second feed module.

As mentioned, a connector is present in each feed module for providing fluid communication between the pressure reservoir chamber and the pressurizable substrate chamber. The fluid communication is such that pressurized gas may flow from the pressure reservoir chamber to the pressurizable substrate chamber. The dimensions (e.g. the internal diameter) of the connector may be such that pressure equilibration between the pressure reservoir chamber and the pressurizable substrate chamber may occur very rapidly. In other words, the flow resistance of the connector should be low. For example, the internal diameter of the connector should be at least about 1 mm.

The means for reversibly interrupting the fluid communication between the pressure reservoir chamber and the pressurizable substrate chamber which has an open state and a closed state is arranged for achieving immediate pressure equilibration between the pressure reservoir chamber and the pressurizable substrate chamber upon changing the state of said means from closed to open. The pressure equilibration includes a sudden increase of pressure in each of the first and the second pressurizable substrate chambers from an initial pressure to a maximum process pressure, also referred to as target process pressure.

In this context, the expression "immediate" or "sudden" means a very rapid pressure change in terms of the absolute duration of the period of time required to reach the target process pressure. Typically, the duration is less than 10 seconds, and in most cases substantially less than 10 seconds; or less than about 9, 8, 7, 6, 5, 3, or 2 seconds, or even less than about 1 second, respectively. In some non-limiting embodiments, the apparatus is configured to achieve a pressure equilibration occurring within about 1, 2 or 3 seconds, or within about 0.5, 1, 1.5, 2, 2.5 or 3 seconds. The duration of the pressure equilibration phase may also depend on the dimensions of the apparatus, including the dead space in the fluid path for the first and the second fluid upstream of the static mixing device, or the duration of the mixing process. For example, for a small batch size of e.g. less than 500 mL (i.e. of the third fluid) or a mixing time of e.g. less than one minute, immediate pressure equilibration may, for example, mean a duration within about 1 or 2 seconds; whereas for a larger batch size or a mixing time of e.g. 5 to 10 minutes, also a duration of more than 2 seconds, such as 2 to 10 seconds, would still represent immediate pressure equilibration.

Accordingly, the time of equilibration is very short in comparison with the duration of the flow of the respective liquid from the flexible container to the static mixer which is effected by such rapid pressure equilibration between the pressure reservoir chamber and the pressurizable substrate chamber; and it is also very short compared to the total mixing time, i.e. the time required for producing the desired or predetermined amount of the third liquid by mixing the first and the second liquid. In some non-limiting embodiments, the pressure equilibration time is not more than about 5% of the total mixing time, and in particular not more than about 3% of the total mixing time. In further non-limiting embodiments, the pressure equilibration time is not more than about 2%, not more than about 1%, or even not more than about 0.5% of the total mixing time.

In other words, the initial pressure equilibration occurs abruptly. In one non-limiting embodiment, the pressure equilibration only requires a fraction of a second (e.g. less than 1 second, e.g. 0.5 s or less) and is already completed or nearly completed when the respective first or second liquid initially reaches the static mixer.

According to another non-limiting embodiment, the duration of time required for pressure equilibration is such that not more than about 5% of the batch, or desired volume, of the third liquid has been produced in the static mixing device before the maximum process pressure has been reached. In further non-limiting embodiments, not more than about 3%, 2%, or 1% of the batch, or desired volume, of the third liquid has been produced in the static mixing device before the maximum process pressure has been reached.

The immediate pressure equilibration between the pressure reservoir chamber and the pressurizable substrate chamber involves a rapid and significant pressure increase in the substrate chamber where the pressurized gas rather suddenly exerts a pressure on an external surface of the flexible container, and a corresponding rapid pressure decrease in the pressure reservoir chamber. As will be understood by a skilled person, the pressure equilibrium achieved by the immediate pressure equilibration is a dynamic equilibrium in that the pressure in the pressure reservoir chamber and the pressure in the substrate chamber, which will be essentially the same after equilibration, may slightly change over time. For example, it may very slightly decrease as the respective first or second liquid flows out of the flexible container, thus reducing the overall volume of the flexible container and increasing the gas space in the substrate chamber. Other factors such as minor temperature changes may lead to slight decreases or increases of the equilibrium pressure.

In some non-limiting embodiments, the total decrease of the equilibrium pressure caused by the flow of the liquid from the flexible container into the static mixer is not more than about 10% of the initial equilibrium pressure. In this way, the pressure decrease during the mixing process cannot substantially impact the mixing process itself. As the skilled person will understand, the total equilibrium pressure decrease during the mixing process can be minimized by e.g. selecting a pressure reservoir chamber having a large internal volume relative to the volume of liquid that is forced to flow from the flexible container into the static mixer. For example, the internal volume of the pressure reservoir chamber may be at least about 10 times the volume of the liquid initially held by the flexible container; or the internal volume of the pressure reservoir chamber may be at least about 15 times, or even about 20 times or more of the volume of the liquid initially held by the flexible container.

In another non-limiting embodiment, the decrease of the equilibrium pressure caused by flow of the liquid from the flexible container into the static mixer is no more than 5%, 4%, 3%, 2% or 1% of the initial equilibrium pressure. In a non-limiting embodiment, the total equilibrium pressure decrease during the mixing process is minimized, or in some non-limiting embodiments, even negligible.

As mentioned, each feed module further includes a pressure sensor for measuring the pressure of the pressurized gas in the respective feed module at or downstream of the pressure reservoir chamber. In some non-limiting embodiments, the pressure sensor is arranged to measure the gas pressure directly in the respective pressure reservoir chamber. Alternatively, the pressure sensor may, for example, be arranged in in the connector, and may be upstream of the means for reversibly interrupting the fluid communication between the pressure reservoir chamber and the pressurizable substrate chamber.

The pressure supply module, as used herein, should be understood as a group of apparatus components that are designed and adapted for supplying a pressurized gas to the feed modules, in particular to the pressure reservoir chambers of the feed modules. As mentioned, the pressure supply module includes a gas inlet and a first and second gas outlet, and a flow path for pressurized gas to flow from the gas inlet to the first and/or second gas outlet. The gas inlet which is reversibly connectable to a source of pressurized gas represents the upstream end of the flow path, whereas the first and second gas outlets which are arranged for supplying pressurized gas to the pressure reservoir chambers of the first and second feed module, respectively, represent the downstream ends of the flow path. The gas inlet may represent any type of inlet or connector, such as a tube connector which is connectible to source of pressurized gas. The gas outlets may, for example, be embodied by tube ends which may be connected to, or even form, the inlets of the pressure reservoir chambers. In some non-limiting embodiments, the gas inlet of the pressure supply module is connected to the source of pressurized gas. In some related non-limiting embodiments, the gas inlet of the pressure supply module is connected to a source of pressurized gas which provides gas at a pressure of about 6 to 10 bar.

The flow path divider is arranged for dividing the flow path downstream of the flow path divider into two sub-paths, i.e. one which ends at the first gas outlet, the other one at the second gas outlet. Such flow path divider may, for example, be a simple T-piece or Y-piece.

As mentioned, at least one pressure amplifier is arranged in the flow path. For example, a single pressure amplifier may be arranged upstream of the flow path divider to increase the gas pressure delivered to both the first and the second gas outlet. Alternatively, or in addition, two pressure amplifiers may be arranged in the flow path downstream of the flow path divider, of which one is fluidically connected with the first gas outlet and the other one is fluidically connected with the second gas outlet. In this context, fluidically connected A pressure amplifier, also sometimes referred to as an air pressure amplifier or pressure booster, is a device that receives an incoming gas (e.g. air) at a specific pressure and delivers an outlet gas having a higher pressure than the incoming gas pressure. Generically, a pressure amplifier may be understood as a pump. Pressure amplifiers may be driven by externally supplied (e.g. electric) energy. Alternatively, the amplifier may be a purely mechanical device driven by a part of the incoming compressed gas supply enabling it to cycle and pump the balance of the supply to a higher output pressure. Pressure may, for example, be generated by using a differential area piston assembly, building on the principle that a low pressure gas applied to a large area generates a high pressure gas on a corresponding small area.

In some non-limiting embodiments, the pressure amplifier(s) used in the apparatus are mechanical devices adapted to amplify gas pressure such that the output pressure is twice the input pressure. For example, they may generate a gas having a pressure of up to about 20 bar from a supplied gas having a pressure of up to about 10 bar. In some further non-limiting embodiments, the pressure amplifiers are adapted for increasing the pressure of the pressurized gas received from the source of pressurized gas to which it is connectible or connected by at least about 50%, wherein the basis of the percentage if the pressure of the pressurized gas received from the source of pressurized gas.

The use of the pressure amplifier(s) is particularly advantageous in that it enables the apparatus to use conventional pressurized air supplies, which typically provide a pressure of not more than about 8 to 10 bar, and still operate at pressures of up to about 16 to 20 bar, which is useful or required for some mixing processes.

As mentioned, the pressure supply module includes at least two pressure control circuits, one of which is adapted to control the pressure of the pressurized gas delivered by the pressure supply module to the pressure reservoir chamber of first feed module; and another one which is adapted to control the pressure of the pressurized gas delivered by the pressure supply module to the pressure reservoir chamber of second feed module.

In some non-limiting embodiments, the pressure control circuits used in the apparatus are electric or electronic control circuits, i.e. they involve a controller that receives electric signals as input and provides control by electric output signals. Typically, an electronic microcontroller is used for this purpose. For the avoidance of doubt, a single microcontroller may be used to simultaneously control both the first and the second pressure control circuit.

In some non-limiting embodiments, each of the first and the second pressure control circuit of the pressure supply module includes a valve and/or an electric pressure regulator arranged between the flow path divider and the respective first or second gas outlet. In some further non-limiting embodiments, each pressure control circuit includes both a valve and an electric pressure regulator. For example, the valve may be a non-regulating valve and arranged downstream of the electric pressure regulator, but upstream of the respective gas outlet.

The electric pressure regulator, which may also be referred to as electronic pressure regulator or simply pressure regulator or electronic regulator (e.g. in FIGS. 1 and 2), is controlled by a microcontroller, as mentioned above. It provides a predetermined output pressure which is independently selectable for each gas outlet. In some non-limiting embodiments, both the valve and the electric pressure regulator are configured to be operated by a microcontroller.

The microcontroller may be configured for receiving signals from the pressure sensor arranged for measuring the gas pressure in the respective first or second feed module. In other words, it controls the pressure regulator in response to the actual pressure in the respective feed module, in particular the pressure in the pressure reservoir chamber with which it is connected, i.e. in response to the signals received by the pressure sensor of the feed module.

In some further non-limiting embodiments, the pressure supply module further includes a pressure reservoir chamber for holding pressurized gas, which is arranged in the flow path. This additional pressure reservoir chamber may, according to some further non-limiting embodiments, be arranged in the flow path upstream of the flow path divider. The inventors have found that such pressure reservoir chamber arranged in the upstream portion of the pressure supply module can substantially dampen pressure fluctuations and allow for a very precise control of the gas pressure in the pressure supply module. In such configuration, for example, pressure control within ±0.01 bar was achieved at a preset pressure of 2 bar.

In some non-limiting embodiments, the flow path in the pressure supply module upstream of the flow path divider includes both a pressure amplifier and, downstream thereof, a pressure reservoir chamber (see e.g. FIG. 1). The pressure supply module may include a further valve arranged in the flow path between the pressure reservoir chamber and the flow path divider. This valve may also be configured to be operated by the microcontroller. Again, and for the avoidance of doubt, the microcontroller that controls the pressure of the pressurized gas delivered to the first gas outlet may be the same as the microcontroller that controls the pressure at the second gas outlet. The valve, like other valves used in the apparatus, may be a non-regulating valve, i.e. it may only entirely (but not partially) interrupt the fluid communication between the—with respect to the position of the valve—upstream and downstream components. It may, however, be selected as a three-way valve allowing a pneumatic element (for example, a pressure reservoir chamber arranged upstream of the valve) to be vented.

Figure 2:
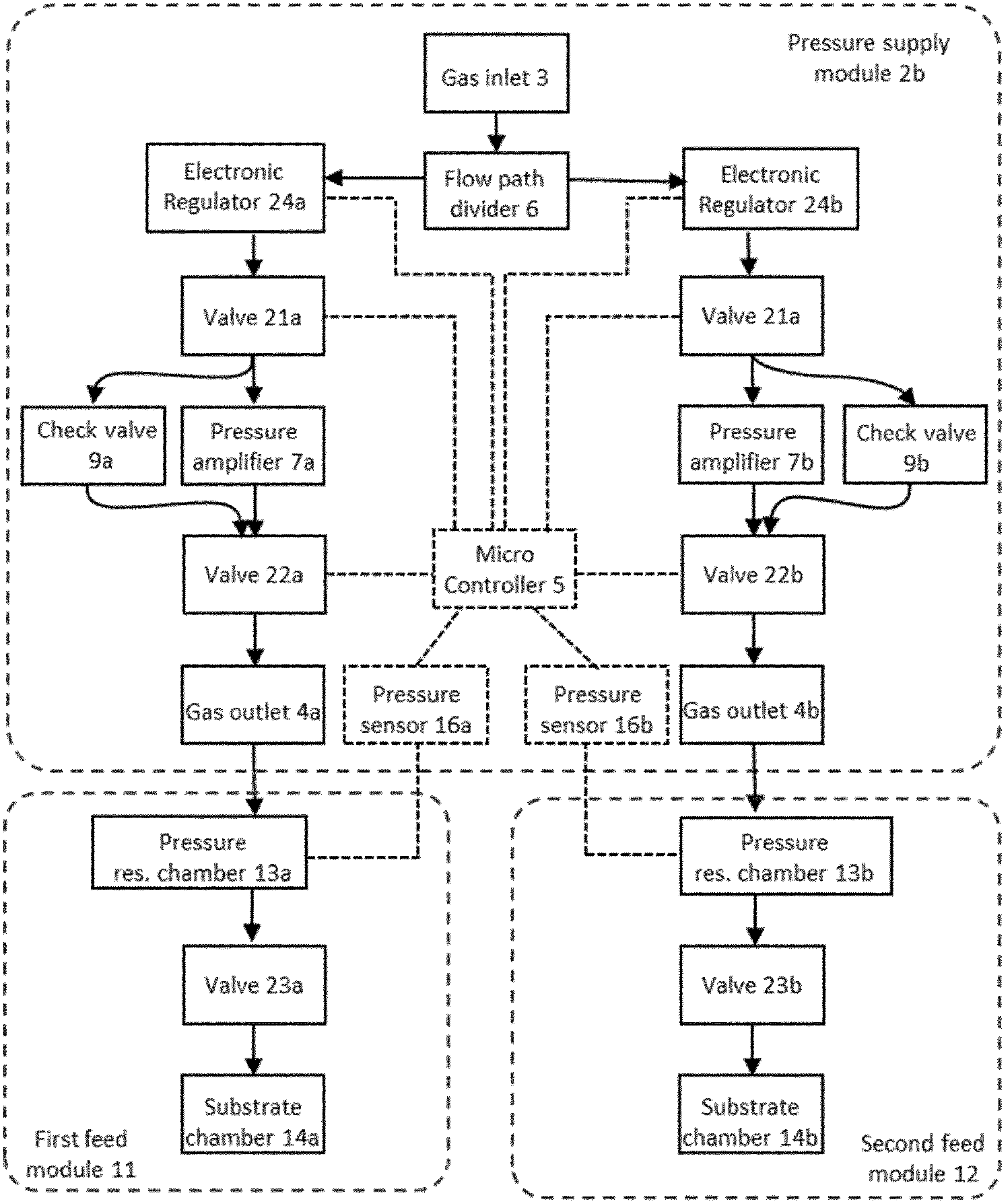
FIG. 2 is a flow chart depicting the pneumatic circuitry and components of another non-limiting embodiment of the apparatus (1).

In some non-limiting embodiments, the pressure supply module includes two pressure amplifiers arranged downstream of the flow path divider, of which a first pressure amplifier is fluidically connected with the first gas outlet and a second pressure amplifier is fluidically connected with the second gas outlet (see e.g. FIG. 2). In this case, it may not be necessary to provide a pressure amplifier upstream of the flow path divider. In related non-limiting embodiments, an electric pressure regulator is arranged between each of the two pressure amplifiers and the flow path divider. Moreover, a further valve may be arranged upstream and/or downstream of each of the two pressure amplifiers. Again, such further valve(s) may be non-regulating, but designed as three-way valve to allow the venting of a neighboring pneumatic element.

In some further non-limiting embodiments, the pressure supply module may further include a flow path diversion arranged for circumventing the at least one pressure amplifier, and a check valve which is arranged in the flow path diversion. Such arrangement is beneficial for reducing the time required for reaching a desired gas pressure the pressure reservoir chambers of the first and second feed module: Initially, i.e. while the gas pressure in the feed module is still lower than the pressure provided by the source of pressurized gas, the amplifier can be circumvented and its inherent flow reduction thereby avoided. Only after the pressure in the pressure reservoir chamber has reached the pressure provided by the source of pressurized gas, the pressure amplifier is used to further increase the pressure until the desired pressure in the pressure reservoir chamber has been reached.

In some of the non-limiting embodiments, the static mixer includes or represents a T-piece mixer, a Y-piece mixer, a vortex mixer, a baffle-based static mixer, a microfluidic mixing device, a multi-inlet vortex mixer (MIVM), or a jet impingement reactor. As used herein, T-piece mixers and Y-piece mixers are mixing devices including a T-piece or Y-piece, respectively, and which function to bring together and mix two liquids in such T-piece or Y-piece. A static vortex mixer is typically a precision engineered device for the continuous mixing of liquids based on baffle-like structures that are shapes such as to create a vortex, which is a region in the liquid mixture in which the flow revolves around an axis which is parallel to the overall direction of flow. Accordingly, such vortex mixer may also be understood as a special type of a baffle-based static mixer. A microfluidic mixing device, as used in the context of the disclosure, is any static mixing device whose fluid conduits typically have a diameter of not more than 2 or 3 mm, and often below 1 mm, which may be designed to offer a relatively (compared to the diameter of the fluid conduits) large interfacial surface between the two liquid substrates, for example by dividing the fluid streams into pluralities of microfluidic streams before bringing the substrates into contact with one another. A multi-inlet vortex mixer (MIVM) is a special type of a static vortex mixer having more than two fluid inlets.

As mentioned, the first and/or the second feed module of the apparatus independently includes a pressure sensing means, or pressure sensor, which may be arranged with, or accommodated within, the pressure reservoir chamber. Alternatively, it may be positioned outside the pressure reservoir chamber but in fluidic communication therewith, for example in the fluid path downstream of the pressure reservoir chamber. The pressure sensing means may also be part of or connected to a pressure amplifier, provided that it is arranged such as to sense the pressure at its outlet, which is in fluidic communication with the pressure reservoir chamber. Each of the first and the second feed module independently may include a pressure sensing means. A feed module may include more than one pressure sensing means.

In some non-limiting embodiments, the pressure sensing means includes, or is connected with, a transducer which generates electrical signals in response to the pressures that it senses. This enables the use of a control loop to activate and operate a valve, an electric pressure regulator or a pressure amplifier in response to the signals received from the respective pressure sensing means.

In some non-limiting embodiments, therefore, the apparatus includes a controller arranged for controlling the gas pressure provided to the first and second feed module in response to signals received from the respective pressure sensing means. The controller, which may be a computer, does not have to be individually provided for each feed module. In other words, a single controller may be used to receive signals from each pressure sensing device and, in response to these signals, activate or operate the respective electric pressure regulator or valve.

Such feedback or control loop may be used to maintain the pressure during the mixing process within narrow boundaries, such as within ±5% of the target process pressure reached upon initial pressure equilibration, i.e. while the means for reversibly interrupting the fluid communication between the pressure reservoir chamber and the pressurizable substrate chamber is in the open state. In this context, the basis if the percentage is the target process pressure.

In some non-limiting embodiments, the pressure supply module is adapted, e.g. by means of the pressure control circuit, to maintain a pressure selected in the range of about 2 to 20 bar in of the pressure reservoir chamber when the means for reversibly interrupting the fluid communication between the pressure reservoir chamber and the pressurizable substrate chamber is in the open state. The selected pressure may vary between the two feed modules, i.e. the pressure is independently selected for each pressure reservoir chamber. For example, for the first feed module, the apparatus may be operated to maintain the operating pressure in the pressure reservoir chamber at a first pressure selected in the range of about 2 to 5 bar, and for the second feed module, the apparatus may be operated to maintain the operating pressure in the pressure reservoir chamber at a second pressure selected in the range of about 6 to 16 bar. Each operating pressure may be maintained within e.g. about +5% (or less, such as within +3%) of the respective selected pressure.

The inventors have found that the apparatus according to these non-limiting embodiments not only allows an extremely rapid start of a stable mixing process which is particularly important for very small batches, but also allows a very high degree of control of the product quality by minimizing fluctuations of the operating pressure which would otherwise result from parameters such as minor changes of dead volumes or temperatures.

The equilibration and time to equilibration as described herein is achievable by changing the state of the means for reversibly interrupting the fluid communication between the pressure reservoir chamber and the substrate chamber from its closed state to its open state. As will be understood in this context, the closed state means an entirely closed state, such as the state of a fully closed valve which substantially prevents fluid flow, whereas the open state means a fully open state such as to allow substantially unrestricted fluid flow. In one of the non-limiting embodiments, the means for reversibly interrupting the fluid communication between the pressure reservoir chamber and the substrate chamber has only these two states, i.e. a fully closed state and a fully open state. In other words, in this non-limiting embodiment, it does not have an intermediate state such as a pressure regulating function, or if it does, such intermediate state is not used when conducting the process described herein.

Accordingly, it is one of the non-limiting embodiments that neither the means for reversibly interrupting the fluid communication between the pressure reservoir chamber and the substrate chamber nor the connector in general includes a pressure regulating member.

The open state may also be characterized in that the means for reversibly interrupting the fluid communication between the pressure reservoir chamber and the substrate chamber in its open state has a fluid path for the pressurized gas having a relatively large cross-sectional area, such as at least about 1 $mm^2$, or at least about 2 $mm^2$, 3 $mm^2$, 4 $mm^2$ or even 5 $mm^2$, respectively.

The means for reversibly interrupting the fluid communication between the pressure reservoir chamber and the substrate chamber may be integrated within the connector, or it may be arranged as part of an outlet of the pressure reservoir chamber or of an inlet of the substrate chamber via which the connector provides the fluid communication between the pressure reservoir chamber and the substrate chamber.

In one of the non-limiting embodiments, the means for reversibly interrupting the fluid communication between the pressure reservoir chamber and the substrate chamber is the sole means for controlling the flow of pressurized gas between the pressure reservoir chamber and the respective pressurizable substrate chamber.

Moreover, in some of the non-limiting embodiments, the apparatus includes a first and a second counterpiece, wherein at least one of these counterpieces includes a first cavity and a second cavity. The counterpieces are configured to be affixed to one another such that one of the pressurizable substrate chambers is formed such as to include the first cavity and another one of the pressurizable substrate chambers is formed such as to include the second cavity.

In this context, a counterpiece should be understood as a solid structural component of the apparatus which has the dimensions and physical properties required for it to provide a part of the respective pressurizable substrate chamber.

In alternative non-limiting embodiments, a first and a second counterpiece are provided which, when affixed to one another, form one of the pressurizable substrate chambers, and a third and a fourth counterpiece are provided which, when affixed to one another, form another one of the pressurizable substrate chambers. Again, the requirement is that at least one of the first and the second counterpiece and at least one of the third and the fourth counterpiece includes a cavity which, when the respective counterpieces are affixed to one another, forms a chamber which can serve as a pressurizable substrate chamber.

In some non-limiting embodiments, a first and a second counterpiece together form both pressurizable substrate chambers, i.e. that of the first and that of the second feed module. The cavities, which may also be understood as depressions of the first and/or second counterpiece, provide the space required for accommodating the flexible containers including the first and second liquid. They may be featured only on the first counterpiece, or only on the second counterpiece, or both on the first and second counterpiece. In the latter case, a pressurizable substrate chamber is formed from a cavity of, or depression in, the first counterpiece which combined with a cavity of, or depression in, the second counterpiece when the counterpieces are affixed to one another.

In some non-limiting embodiments, the first counterpiece is substantially immovable, and the second counterpiece is movable such that the corresponding counterpieces can be affixed to one another in such a way that the cavities described above form the pressurizable substrate chambers. In some non-limiting embodiments, the counterpiece is rotatable and hingingly connectable or connected to the first counterpiece. The hinging connection may be arranged on any side of the first and/or second counterpiece.

In some non-limiting embodiments, the first and the second counterpiece have a vertical operating orientation, and the hinging connection is arranged at a lower side or end of the second counterpiece. In alternative non-limiting embodiments, the hinging connection is arranged at one of the vertical sides or at the upper side of the second counterpiece.

Advantageously, at least one circumferential gasket may be provided between the first and the second counterpiece to separately seal each of the pressurizable substrate chambers. In other words, each pressurizable substrate chamber that is formed when the first and the second counterpiece are affixed to one another is individually sealed by the at least one circumferential gasket. Such gasket may, for example, be provided on either of the counterpieces. The sealing of the two chambers may be accomplished by a single gasket provided that it is shaped such as to seal each chamber separately. Alternatively, a separate circumferential gasket may be provided to seal each pressurizable substrate chamber. Each of the first and the second counterpiece may be provided with at least one circumferential gasket. In any case, each pressurizable substrate chamber must be separately sealed, even if by only one gasket, as the operating pressures in the substrate chambers often differ from one another.

In some non-limiting embodiments, at least two circumferential gaskets are provided between the first and the second counterpiece to separately seal each of the pressurizable substrate chambers, and wherein a frame for holding the flexible containers for holding the first liquid and for the second liquid is sealed between the at least two circumferential gaskets. Accordingly, the apparatus is adapted for holding such frame used for holding the flexible containers, wherein the frame is "sandwiched" and sealed between the first and second counterpiece. One side of the frame is sealed by at least one circumferential gasket against the first counterpiece, whereas the other side of the frame is sealed by at least another circumferential gasket against the second counterpiece, wherein each of the gaskets is shaped such that the pressurizable substrate chambers are sealed separately.

In some further non-limiting embodiments, the pressurizable substrate chamber and the pressure reservoir chamber of each of the first and the second feed module are in fluid connection via an opening in the first or second counterpiece, respectively, said opening being the gas outlet of the respective pressure supply module. Each opening is arranged and located in a region of the counterpiece which will become part of one of the pressurizable substrate chambers when the two counterpieces are affixed to one another. In some non-limiting embodiments, these openings for providing pressurized gas to the pressurizable substrate chambers are accommodated in the first counterpiece which is substantially immovable.

A particular advantage of the disclosure is that the pressure in the pressure reservoir chamber and the volume ratio of the pressure reservoir chamber to the pressurizable substrate chamber of each feed module may be preselected such as to achieve a desired pressure in the pressurizable substrate chamber and thereby a desired flow rate by which a given liquid is squeezed out from a given flexible container and fed to the mixing device. Consequently, the use of pumps or process controls relying on flow meters can be avoided. As generally known to the person skilled in the art, the internal pressure of two chambers that are put in fluid connection with one another (such as the pressure reservoir chamber and the substrate chamber upon opening the e.g. valve of the connector between these chambers) will become identical, and the resulting pressure in the chambers may be precisely calculated and predicted on the basis of the initial pressures in the chambers before establishing the fluid connection and the internal volumes of the chambers.

The actual flow rate of a liquid that is discharged from a flexible container comprised in the substrate chamber will of course also depend on other parameters such as the viscosity of the liquid and the flow resistance of the fluid path downstream of the flexible container. For a given liquid and a given flow path, however, the pressure which is required to obtain a specific flow rate can easily be determined experimentally. Once it is known, the feed module may be readily configured to achieve such target pressure, i.e., by calculating and selecting the specific chamber volumes and the starting pressure of the pressure reservoir chamber. If the batch size changes and the volume of the flexible container and of the pressurizable substrate chamber is changed, the feed module can be easily reconfigured to achieve the same target pressure and the same flow rate, e.g., by adapting the starting pressure or the internal volume of the pressure reservoir chamber. This versatility is another advantage.

As mentioned, one of the static mixers for whose operation the apparatus is adapted for is a jet impingement reactor. The function of jet impingement reactors involves the injection of two fluid streams, e.g., a first stream of the first liquid and a second stream of the second liquid to be mixed, through nozzles into a reactor cavity such that the streams collide in a turbulent mixing zone. The first and the second stream may be injected from directly opposite positions of the reactor, such that the streams collide substantially frontally, i.e., in an angle of substantially about 180°. Examples of jet impingement reactors include confined impingement jet (CIJ) reactors and microjet reactors (MJR).

In one of the non-limiting embodiments, the static mixer is a jet impingement reactor having a mixing chamber defined by an interior surface of a mixing chamber wall, the mixing chamber having a substantially spheroidal overall shape, wherein the mixing chamber includes:

- a first and a second fluid inlet, wherein the first and the second fluid inlet are arranged at opposite positions on a first central axis of the reaction mixing chamber such as to point at one another, and wherein each of the first and the second fluid inlet includes a nozzle; and
- a fluid outlet arranged at a third position, said third position being located on a second central axis of said chamber, the second central axis being perpendicular to the first central axis; and
- wherein the distance between the nozzle of the first fluid inlet and the nozzle of the second fluid inlet is the same or smaller than the diameter of the mixing chamber along the first central axis. Moreover, such jet impingement reactor may have further features as described in the international patent application WO 2023/025736, which is incorporated herein by reference.

When using the apparatus for operating the static mixer, it is normally required that a conduit for providing fluid communication between the interior space of the flexible container and the respective inlet of the static mixer is provided. Specifically, the conduit of the first feed module provides a fluid connection between the interior space of the flexible container holding the first liquid and the first inlet, and the conduit of the second feed module provides a fluid connection between the interior space of the flexible container holding the second liquid and the second inlet of the static mixer. The conduit may, for example, include or represent a tube, which may be flexible, such as a tube made of an elastomeric (polymeric) material, or rigid, such as a metal tube.

In one non-limiting embodiment, the conduit associated with the first and/or the second feed module includes a means for-reversibly-interrupting the fluid communication between the interior space of the flexible container and the respective inlet of the static mixer. The means may be a valve. If the conduit is a flexible tube, such as plastic tubing, the fluid communication may alternatively be interrupted initially by a tube clamp, in which case the respective fluid connection is generated by opening or removing the clamp, which allows the fluid to flow from the flexible container to the static mixer once the substrate chamber becomes pressurized.

In one non-limiting embodiment, there is no means for interrupting the fluid connection arranged in the conduit associated with the first and/or the second feed module. The conduit may include a connection, e.g. achieved by the engagement of a connecting piece initially introduced as part of the outlet of the respective flexible container with a complementary connecting piece of a downstream part of the conduit that leads to the respective inlet of the static mixing device.

To initiate the pressurization of the substrate chamber, the means for reversibly interrupting the fluid communication between the pressure reservoir chamber and the pressurizable substrate chamber is opened or removed, such that the connector is open or free and generates said fluid connection. As used herein, the connector is any piece, conduit, pipe or tube capable of allowing pressurized gas to flow from the pressure reservoir chamber to the pressurizable substrate chamber, or between these chambers. The means may be a clamp, if the connector material is flexible, or a valve. In one of the non-limiting embodiments, the means is a valve.

In order to achieve sufficient pressure in the pressurizable substrate chamber without requiring the pressure reservoir chamber to be very highly pressurized before bringing the two chambers into fluid communication, e.g., by opening a valve of the connector, the pressure reservoir chamber may be designed to be relatively large. For example, the pressure reservoir chamber may have a larger volume than the substrate chamber with which it is in fluid communication. In this context, the volume should be understood as the internal volume of the respective chamber. The volume of the pressure reservoir chamber may be twice as large as that of the respective substrate chamber, or even larger. In some non-limiting embodiments, the ratio of the volume of the pressure reservoir chamber to the volume of the pressurizable substrate chamber is at least about 2, or at least about 3, or at least about 4, in particular at least about 5, and at least about 10. In other non-limiting embodiments, the ratio is in the range from about 2 to about 10. In further non-limiting embodiments, it is in the range from about 10 to about 100, such as about 20 to about 50. For example, the pressure reservoir chamber may have an internal volume of about 2 to about 10 liters, or from about 5 to about 30 liters, and the corresponding substrate chamber may have an internal volume of about 0.3 to about 3 liters, or of about 0.3 to about 1 liter. In a further non-limiting embodiment, the pressure reservoir chamber has a substantially cylindrical or cylindroidal overall shape.

As will be understood by the person skilled in the art, the preparation of the apparatus for producing a batch of a liquid mixture (i.e. the third liquid) by mixing two liquid substrates (i.e. the first and the second liquid) would involve the filling of the pressure reservoir chambers of the first and the second feed module with a pressurized gas. The amount of pressurized gas to be used for this purpose, or the pressure that a pressure reservoir chamber should have at the beginning of the batch production, is selected with an eye on the volume of that chamber and of the corresponding pressurizable substrate chamber, also taking into account the viscosity of the respective liquid, the flow resistance of the flow path and the desired flow rate. A typical initial pressure in a pressure reservoir chamber may, for example, be in the range of about 2 bar to 20 bar. Other pressures may also be used, depending on the selection of the pressurized gas that is used.

Moreover, the pressures may be selected such that the first and the second liquid are forced from the containers into the respective conduit that directs it to the static mixer at a flow rate in the range from about 10 to about 200 ml/min.

In general, any technically suitable pressurized gas or gas mixture may be used. Examples of potentially useful gases include, without limitation, nitrogen, oxygen, air, inert gases such as helium, carbon dioxide, nitrous oxide, diethyl ether, n-butane, isobutane, heptafluoropropane, tetrafluoroethane, dichlorodifluoromethane, or propane. Among the gases may be nitrogen, air, and carbon dioxide. In particular, the pressurized gas may be pressurized air.

According to a further non-limiting embodiment, the dimensions of each pressurizable substrate chamber are selected such that its internal volume (or interior space) is only slightly larger than the overall, or external, volume of the flexible container that it should hold. For example, the flexible container in its initial dimensions, i.e., when filled with the liquid substrate and before a fluid communication with the static mixer is established, or when it is inserted into the pressurizable substrate chamber, may fill at least about 30% of the total internal volume of the respective substrate chamber, or at least about 50%. As used herein, the total internal volume of the chamber-which is the basis of these percentages-should be understood as the total internal volume of the substrate chamber when empty. In further non-limiting embodiments, the initial overall volume of the flexible container is at least about 60%, or at least about 70%, or in the range from about 60% to about 95%, of the total internal volume of the pressurizable substrate chamber.

The dimensions of the two flexible containers that hold the first and the second liquid, respectively, may also differ from one another. This results from the somewhat more typical situation according to which one of the two liquids must be provided at a larger volume, or flow rate, than the other liquid, for obtain a desired product. It is therefore another non-limiting embodiment that also the dimensions of the two substrate chambers that hold the flexible containers differ from one another. This applies in particular to the internal volumes of the chambers, which may be different from each other. In one non-limiting embodiment, the difference between the internal volume of the substrate chamber of the first feed module and the internal volume of the substrate chamber of the second feed module is a factor in the range from about 1.5 to about 10, or from about 2 to about 5. In this context, the internal volume means the total internal volume of the respective chamber, i.e., when empty.

As mentioned, the flexible containers are for holding the liquid substrates, i.e., the first and the second liquid from which the third liquid is formed by mixing, using the apparatus of the disclosure. The containers may be flexible to the extent that they are at least partially collapsible. In other words, their internal volume may substantially change depending on the shape of the container wall(s) at a given moment.

In a further non-limiting embodiment, the flexible containers are flexible plastic bags, similar to infusion bags. The bags may be disposable. The bags may include the first or second liquid in sterile form. As indicated above, it is one of the advantages of the present disclosure that it enables the easy, quick and versatile aseptic manufacture of small batches, which is substantially facilitated by the use of sterile raw materials and disposable containers that do not have to be cleaned or sterilized between two batch production campaigns.

In one of the further non-limiting embodiments, the apparatus is set up and/or oriented such that the liquids that are processed in the apparatus or obtained by the use of the apparatus have an overall direction of flow which is in the upward direction, i.e., against gravity. For example, the conduits for providing fluid communication between the interior space of the flexible containers and the first and the second inlet of the static mixer may be oriented such that their downstream ends that are in a higher position than their upstream ends. For the avoidance of doubt, the upstream end of a conduit is the end that is connected to the flexible container, and the downstream end of the conduit is connected to the first or second inlet of the static mixer. In this context, a higher position means being located above a comparatively lower position, with respect to a horizontal axis of the apparatus in its normal operational orientation.

Similarly, the static mixing device, or static mixer, may be oriented such that its outlet is in a higher position compared to its inlets. Also advantageous is this orientation of the static mixer in combination with the previously described orientation of the conduits. In this case, the entire overall liquid flow from the flexible containers to the outlet of the static mixer is in an upward direction. Such flow direction has been found to reduce or even avoid the entrapment of gas bubbles in the product, i.e. in the liquid mixture that represents the third liquid, in particular if the product contains surface-active compounds, as is the case when producing liposomes or lipid nanoparticles, which is described below in the context of the method according to the disclosure. Also the inlet of the product container may be arranged in a higher position relative to the outlet of the static mixer.

According to a further non-limiting embodiment, the apparatus is entirely adapted for aseptic processing. This would include providing all substrate- or product-contacting surfaces in sterile form. It would further include the use of a sterile container for receiving the product prepared with the apparatus, i.e., the third liquid. Accordingly, the outlet of the static mixer may be fluidically connectable, or actually connected, to a container for receiving the third liquid, wherein said container is may be a flexible container. The connection may involve a sterile tube between the outlet of the static mixer and the container. This product container is also referred to as a first container for receiving the third liquid. For the avoidance of doubt, the expression "first container" does not imply any processing sequence; for example, if the apparatus is arranged with a first and a second container for receiving the third liquid, the process may be conducted such that the second container received an amount of the third liquid before the first container does.

The product container, or first container, may thus be a sterile, flexible bag that is aseptically connected with the outlet. In this context, aseptically connected means that the connection is sufficiently tight to prevent the contamination of the third liquid with e.g. airborne contaminants, in particular microbiological contaminants. It will be appreciated by the skilled person that this will further facilitate aseptic small-scale batch manufacture in that the product can be easily removed from the apparatus, e.g., by clamping the connecting tube such as to seal the product container, and then cutting off the container upstream of the clamp.

The connection between the outlet of the mixing device and the product container may include a filter, such as a sterile filter with a filter membrane having an effective pore diameter of 0.2 μm or 0.22 μm which is capable of removing microbiological contaminants from the third liquid. Of course, such filters may also be used at other positions within the apparatus, such as at the inlets for pressurized gas, or within the conduits for providing fluid communication between the interior space of the flexible container holding the liquid substrates and the corresponding inlet of the static mixer. Such filters may also be at the inlets of the flexible container and provide for an aseptic filling of the substate into the container. These filters may be removable under sterile conditions, such that they can be removed when the containers are placed into the substrate chambers.

In a further non-limiting embodiment, the apparatus includes a means for reversibly interrupting the fluid connection between the outlet of the static mixer and the first container for receiving the third liquid. For example, a pinch valve is suitable as a means for interrupting this fluid connection. Both electrically and pneumatically driven pinch valves are suitable in the context of carrying out this non-limiting embodiment.

In a further non-limiting embodiment, the first container for receiving the third liquid includes a first and a second fluid inlet, wherein the first fluid inlet is connectable to the outlet of the static mixer, and the second fluid inlet is adapted for filling a quantity of a liquid diluent into said first container. In this context, it is clear that "connectible" means fluidically connectable. This non-limiting embodiment is advantageous in case it is desired to change the composition of the third liquid after its discharge from the static mixer by adding one or more further constituents. Typically, these one or more further constituents are added in liquid form, i.e. in the form of the liquid diluent. The second fluid inlet allows the introduction of such liquid diluent either before or after the first container receives the third liquid.

It should be noted that the liquid diluent may have other functions, or even have an entirely different key function than diluting the third liquid. For example, the liquid diluent may serve to adjust the pH of the product to a certain value, and it may for this purpose contain a pH-adjusting agent such as an acid, a base, a buffer salt, or a buffer system. Alternatively or in addition, the liquid diluent may include an isotonizing agent such as sodium chloride, a sugar, a sugar alcohol or any other osmotically active compound. It may also include a lyophilization aid, such as a sugar or sugar alcohol. Examples of suitable lyophilization aids include, without limitation, trehalose, sucrose, glucose, mannitol and sorbitol. Any combinations of a pH-adjusting agent, an isotonizing agents, and/or lyophilisation aid may also be used.

To facilitate the aseptic introduction of the liquid diluent into the container via one of the fluid inlets, an inline sterile filtration means may be arranged upstream of the respective fluid inlet. Such sterile filtration means will typically include a filter housing and a filter, such as a filter membrane having an effective pore diameter of e.g. 0.2 or 0.22 μm. After the aseptic introduction of the liquid into the container, sterile filtration means may be aseptically removed by melt clamping, or melt sealing the inlet upstream of the filtration means with simultaneous removal of the filtration means.

In addition to the product container, or first container, there may also be a second container for receiving the third liquid, i.e. an amount thereof. In other words, the outlet of the static mixer may be fluidically connectable to a second container for receiving the third liquid. The second container may also a flexible container, such as a bag-like container. The outlet of the static mixer may be in fluid connection with both the first and the second container, for example, via a T-piece.

One of the specific advantages of such arrangement is that the second container may be used for product waste, such as product obtained at the very initial phase of operating the apparatus or at the end of a batch process. This may be particularly useful if there is a risk that the product will achieve its target specification only after the initial phase or before the phase of the batch process.

In order to use both the first and the second container without interrupting the mixing process, a means for reversibly interrupting the fluid connection between the outlet of the static mixer and the second container for receiving the third liquid may be arranged. In one of the non-limiting embodiments, the apparatus is configured to be operated with a first and a second container for receiving the third liquid in fluid connection with the outlet of the static mixer, with a means for reversibly interrupting the fluid connection arranged upstream of each of the two containers, and downstream of the position where the fluid paths to the two containers divide, e.g. the T-piece if used.

Again, a pinch valve is suitable as a means for interrupting the fluid connection also between the static mixer outlet and the second container for receiving the product, which may represent a waste container. Both electrically and pneumatically driven pinch valves are suitable in the context of carrying out this non-limiting embodiment.

In one non-limiting embodiment, the apparatus is configured to operate the pinch valves in response to a parameter measured in the third liquid generated by the mixing process. For example, if the third liquid is a liposome dispersion or a dispersion including lipid nanoparticles, an important product parameter could be represented by the particle size measured in the third liquid. The apparatus may therefore include a means for inline particle size measurement of the third liquid. In this context, inline means that the measurement is performed in real time during the mixing process without interrupting the process or the liquid flow, and without requiring the withdrawal of a sample of the third liquid for the purpose of measurement.

In one non-limiting embodiment, the means for inline particle size measurement is located in a downstream portion of the static mixer, in the outlet of the static mixer, or downstream of and in fluid connection with the outlet of the static mixer. This should be understood such that at least the sensor which senses a signal from which the particle size is determined is located in one of the specified positions.

The means for inline particle size measurement may include a transparent sensing window, or measuring window, for allowing the transmission of optical signals from the third liquid to a sensor which is not in fluid communication with the third liquid. For example, the transparent measuring window may be provided in the form of a capillary made of glass or plastic.

These features enable inline particle size measurement of the third liquid by means of optical methods such as light scattering or laser diffraction. Sensing a signal emitted or returned from the third liquid during its flow in the apparatus requires the presence of a transparent portion or window in the wall of any of the structures in which the third liquid flows. Such transparent portion or window may be present in a downstream portion of the static mixer, in the outlet of the static mixer, or in a downstream of and in fluid connection with the outlet of the static mixer, such as near the outlet of the static mixer, and—if two containers for receiving the third liquid are used—for example, upstream of the position where the fluid paths to these two containers separate. For example, a capillary made of glass or transparent plastic may form part of the structure that conducts the third liquid from the static mixer to the product container. Such capillary may also be part of the mixer itself. In fact, according to one of the non-limiting embodiments of the disclosure, the static mixing device is made of glass or plastic. Also, a static mixing device may be made of transparent glass or plastic. In this context, transparent means sufficiently transparent to allow the transmission of an optical signal for particle size measurement.

A skilled person will understand that the guidance provided herein which refers to the location of the means for inline particle size measurement primarily refers to the location where the measuring means, e.g. the sensor, interacts with the third fluid. Other components of the measuring means, such as a laser beam generator or the like, may be located at a certain distance to the specified locations.

In one non-limiting embodiment, the transparent region, e.g. the capillary made of glass or plastic, has an interior surface that is coated with a layer of a material exhibiting low protein or nucleic acid binding. Alternatively, the capillary may be made of a type or grade of glass or plastic that exhibits low protein or nucleic acid binding.

In particular, the static mixers may be made of plastic. In this context, the expression “made of plastic” should be understood as being made largely or predominantly of a polymeric material, which however does not exclude the presence of certain amounts of non-polymeric material. Moreover, the main material of which the static mixer is made may represent a (e.g. thermoplastic) polymeric material that further contains one or more additives such as glass fibers, ceramic fillers, plasticizers, antioxidants, coloring agents, antimicrobial agents, antistatic agents, UV stabilizers, flame retardants and the like.

As mentioned before, it may be desirable to arrange and orient the apparatus components such that the main overall direction of liquid flow during the mixing process is upwards, i.e. from a lower position to a higher position. Accordingly, in one non-limiting embodiment, also the first and/or the second container for receiving the third liquid may be arranged in a higher position than the outlet of the static mixer such as to achieve an upward liquid flow downstream of the static mixer. More precisely, the inlet(s) of the first and/or the second container may be arranged in a higher position than the outlet of the static mixer to achieve an upward liquid flow direction from the static mixer to the product and/or waste container(s).

As there may be cases in which there is a need for further processing the third liquid, or the mixture obtained from combining the third liquid with the liquid diluent, it may be advantageous to use a first and/or second container which further includes an outlet for withdrawing liquid. This applies particularly to the first container.

In a further aspect, the present disclosure provides an apparatus for mixing a first liquid and a second liquid. The apparatus includes (a) a static mixer, (b) a first feed module for providing the first liquid, and (c) a second feed module for providing the second liquid to the static mixer. The static mixer itself is characterized in that it exhibits a first inlet for receiving the first liquid, a second inlet for receiving the second liquid, and an outlet for discharging a third liquid that results from mixing the first liquid and the second liquid. Furthermore, each of the first and the second feed module independently includes (i) a substrate chamber for holding a flexible container, said flexible container having an interior space for holding the first liquid or the second liquid, respectively; (ii) a conduit for providing fluid communication between the interior space of the flexible container and the first or the second inlet of the static mixer, respectively; (iii) a pressure reservoir chamber for holding a pressurized gas, said pressure reservoir chamber having an inlet and an outlet for pressurized gas; (iv) a pressure amplifier arranged upstream of the pressure reservoir chamber, said pressure amplifier including an inlet which is reversibly connectable to a source of pressurized gas, and an outlet for pressurized gas which is in fluid connection with the inlet of the pressure reservoir chamber; (v) a connector for providing fluid communication between the pressure reservoir chamber and the substrate chamber, wherein said connector includes a means for reversibly interrupting the fluid communication between the pressure reservoir chamber and the substrate chamber, wherein said fluid communication is for permitting a flow of pressurized gas from the pressure reservoir chamber to the substrate chamber such as to exert pressure on an external surface of the flexible container and to force the first or second liquid from the container into the conduit. The means for reversibly interrupting the fluid communication between the pressure reservoir chamber and the substrate chamber has an open state and a closed state. Moreover, the connector and said means are arranged for achieving immediate pressure equilibration between the pressure reservoir chamber and the substrate chamber upon changing the state of said means from closed to open.

In some non-limiting embodiments, the apparatus as disclosed above is adapted for conducting the method as described below.

In a further aspect, the disclosure provides a method of mixing a first liquid and a second liquid such as to obtain a third liquid, the method essentially being characterized in that an apparatus as described above is used for the mixing of the liquids.

In a related non-limiting embodiment, the method of mixing a first liquid and a second liquid includes the steps of (aa) providing a first flexible container holding the first liquid, said first flexible container being housed in a first pressurizable substrate chamber; (bb) providing a second flexible container holding the second liquid, said second flexible container being housed in a second pressurizable substrate chamber; (cc) providing a static mixer having (i) a first inlet for receiving the first liquid, (ii) a second inlet for receiving the second liquid, and (iii) an outlet for discharging a third liquid that results from mixing the first liquid and the second liquid; (dd) pressurizing the first and the second pressurizable substrate chamber independently by means of a pressurized gas which exerts pressure on an external surface of each of the first and the second flexible container such as to force said first and said second liquid through the static mixer such as to mix said first and said second liquid; and (ee) collecting the third liquid. In this context, independently means that each pressurizable substrate chamber is independently pressurized by pressurized gas, such that the gas pressure may differ between the two pressurizable substrate chambers.

As a skilled person will understand, steps (aa), (bb) and (cc) may be conducted in any sequence, and/or simultaneously. Steps (dd) and (ee) which follow steps (aa), (bb) and (cc), are conducted essentially simultaneously or with a substantial temporal overlap in that step (ee) may start and end with a small delay after the start and end of step (dd).

Step (ee) may advantageously include the collection of at least a portion of the third liquid in a first container for receiving the third liquid, said first container being arranged in fluid connection with the outlet of the static mixer.

As explained above in the context of the description of the apparatus features, step (dd) may include first substep which is characterized by a sudden, or abrupt, increase of pressure in each of the first and the second pressurizable substrate chamber. In a non-limiting embodiment, the pressure in the substrate chambers increases the from an initial pressure to a target process pressure (also referred to as maximum process pressure) within less than about 2 seconds, and/or within less than about 5% of the total time required for mixing said first and said second liquid. Again, the target process pressure is independently selected for each pressurizable substrate chamber.

In some non-limiting embodiments, the first substep includes changing the state of the means for reversibly interrupting the fluid communication between each pressure reservoir chamber and the respective pressurizable substrate chamber from closed to open and generating a pressure equilibrium between each pressure reservoir chamber and the respective pressurizable substrate chamber within a period of not more than about 2 seconds.

As mentioned, the abrupt nature of this pressure increase may also be described in relation to the duration of the overlapping step (ee) of collecting the third liquid. In non-limiting embodiments, the duration of the abrupt pressure increase in each of the first and the second pressurizable substrate chamber up to an initial equilibrium pressure is less than about 10 percent of the duration of step (ee), or less than about 5 percent, less than about 2 percent, or even less than about 1 percent of the duration of step (ee). As will be understood, the duration of step (ee) substantially reflects the time period during which the third liquid is actually generated in the static mixing device from the mixing of the first and the second liquid.

In further related non-limiting embodiments, the initial pressure is approximately ambient pressure, and the target process pressure is in the range from above 1 to 16 bar. Also, a target process pressure may be in the range from about 2 to 12 bar, such as about 2 to 5 bar, or 4 to 8 bar, or 3 to 10 bar, respectively.

As mentioned, the pressurization of the substrate chambers is achieved by means of a pressurized gas which exerts pressure on an external surface of the respective pressurizable substrate chamber. In non-limiting embodiments, this pressurized gas is provided by a pressure reservoir chamber, as already described. In this case, the target process pressure in a substrate chamber also corresponds to the initial equilibrium pressure that is reached upon the pressure equilibration between a pressure reservoir chamber and the respective substrate chamber.

The pressurizing step (dd) may further include a second substep, said second substep being characterized in that the target process pressure is maintained in each of the first and the second pressurizable substrate chamber for a selected period of time. In some related non-limiting embodiments, the target process pressure is maintained in each of the first and the second pressurizable substrate chamber for a period of time which is at least 50% of the total time required for mixing said first and said second liquid. In further non-limiting embodiments, the target process pressure is maintained for a period of time which is at least 80%, or at least 90%, of the total time required for mixing the first and said second liquid.

In this context, reaching (as in the first substep of step (dd)) or maintaining (as in the second substep of step (dd)) a target process pressure should be understood such as to allow for technically acceptable tolerances. For example, a target process pressure may be considered to be reached or maintained if the actual pressure when carrying out the method is within about ±10%, and in particular within about +5%, of the preselected target process pressure. For example, if the preselected target process pressure of a pressurizable substrate chamber is 6.0 bar, that pressure is maintained if the actual pressure remains within the range of 5.7 to 6.3 bar. It is noted that the inventors have found that far more precise pressure control is possible when using the apparatus as described herein-above for conducting the present method.

As said, and according to some non-limiting embodiments, after reaching the maximum or target process pressure in each of the first and the second pressurizable substrate chamber, a pressure is maintained independently in the first and the second pressurizable substrate chamber that does not deviate from the respective maximum process pressure by more than 10%, or by more than 5%, until a desired volume of the third liquid has been discharged from the static mixer. Also, a non-limiting embodiment may be one in which the pressure in each pressurizable substrate chamber is maintained within not more than about 3% of the maximum process pressure (or target process pressure, or initial equilibration pressure). The end of the mixing process is reached when the desired amount of the third liquid has been generated. Typically, this coincides with the point in time by which all or most of the first and/or the second liquid has been forced through the static mixer, such as at least about 95% of the first and/or the second fluid initially provided in the first and/or the second flexible container.

In other words, the maximum process pressure, or the initial equilibrium pressure, is also the target pressure that is maintained after equilibration throughout the mixing process and the preparation of a desired volume, or batch, of the third liquid. To end the mixing process, the means for reversibly interrupting the fluid communication between the respective pressure reservoir chamber and the respective pressurizable substrate chamber may simply be changed from its open state back to its closed state.

Accordingly, in related non-limiting embodiments, each of the first and the second pressurizable substrate chamber is connected to a first and a second pressure reservoir chamber for holding the pressurized gas by means of a connector for providing fluid communication between the pressure reservoir chamber and the respective pressurizable substrate chamber, wherein a means for reversibly interrupting the fluid communication between each pressure reservoir chamber and the respective pressurizable substrate chamber is arranged; said means having an open state and a closed state; before conducting the pressurizing step (dd), the respective pressure reservoir chamber is in a pressurized state such that its pressure is about 2 to 20 times higher than the pressure of the respective pressurizable substrate chamber, and the means for reversibly interrupting the fluid communication between the respective pressure reservoir chamber and the respective pressurizable substrate chamber is in the closed state.

For the avoidance of doubt, the first pressurizable substrate chamber is connected to the first pressure reservoir chamber via a first connector, and the second pressurizable substrate chamber is connected to the second pressure reservoir chamber via a second connector. A first means is arranged for reversibly interrupting the fluid communication between the first pressure reservoir chamber and the first pressurizable substrate chamber, which means may be associated with the first connector, and a second means is arranged for reversibly interrupting the fluid communication between the second pressure reservoir chamber and the second pressurizable substrate chamber, which means may be associated with the second connector. There is no fluid communication between the first pressurizable substrate chamber or the first pressure reservoir chamber and the second pressurizable substrate chamber or the second pressure reservoir chamber. Moreover, there is no fluid contact between any pressurized gas and the first or the second liquid. As used in this context, the expression “respective” means “corresponding”, “connected” or “associated”.

In further related non-limiting embodiments, the pressurizing step (dd) includes forcing essentially the entire amount of said first and said second liquid to flow from the respective flexible container through the static mixer such as to generate the third liquid over a period of at least about 5 seconds, or at least 10 seconds, such as from about 10 seconds to about 15 minutes. The skilled person will understand that the duration of liquid flow will vary depending on the flow rates but also the batch sizes.

For maintaining the gas pressure in the pressure reservoir chambers and the pressurizable substrate chambers after the initial equilibration in the first substep of the pressurizing step (dd), the function of the pressure supply module as described above is important. During operation, the gas inlet of the pressure supply module may remain connected to the source of pressurized gas. By the action of the at least one pressure amplifier arranged in the flow path of the pressure supply module and through the control by the pressure control circuits, additional pressurized gas is delivered to the pressure reservoir chambers such as to precisely maintain the target process pressure. As mentioned, the use of a further pressure reservoir arranged in the flow path of the pressure supply module may further increase the precision of the pressure control.

As mentioned, in some of the non-limiting embodiment, the apparatus is oriented such that the conduit for providing fluid communication between the interior space of the flexible container and the first or the second inlet of the static mixer includes an upstream end connected to the flexible container and a downstream end connected to the first or second inlet of the static mixer, wherein the downstream end is in a higher position than the upstream end. In other words, at least the flexible container(s) and the static mixer are arranged such that the liquid flow occurs in an upward direction.

With respect to the various features of the static mixer, the chambers and other device features, reference is made to the disclosure above. In other words, non-limiting embodiments provided for the apparatus provided according to the disclosure are also applicable to the method, such that non-limiting embodiments of the method are characterized by the use of apparatus features for performing the mixing of the two fluids. Moreover, process features have specifically been described in the context of the apparatus as appropriate for explaining its function.

For example, in some non-limiting embodiments, the method may further include a step of filling a liquid diluent into said first container before or after the third liquid is received in said first container. For filling the liquid diluent into the container, the container may—at least initially—include a further inlet and, associated with this inlet, a means for inline sterile filtration. Accordingly, the method of the disclosure may include the filling of a liquid diluent into the first container, which may be done through a further inlet of the container and a sterile filter that is associated with this inlet. The liquid diluent may be an aqueous liquid composition. It may further include, for example, a pH-adjusting agent, an isotonizing agent, a lyophilization aid, or any combination thereof.

Regardless of whether the third liquid collected in the first (or product) container downstream of the static mixer is combined with a liquid diluent or not, further processing steps may follow, for example in order to further purify or characterize the product or to render it more stable and facilitate handling, storage, and shipment. Such further processing may be also conducted under aseptic conditions.

For example, further processing may include a step of tangential flow filtration, chromatography, freezing or freeze drying of the third liquid collected according to step (ee) or a mixture of the third liquid with the liquid diluent. Tangential flow filtration or chromatography may be useful for the purpose of concentrating the product, e.g. in the sense that the concentration of any particles generated by the mixing of the first and the second liquid such as liposomes or lipid nanoparticles is increased; or for removing or reducing the concentration of certain solutes, such as free molecules of a biologically active ingredient, i.e. molecules that are not incorporated in liposomes or lipid nanoparticles. Freezing or freeze drying may be useful to convert the third liquid or the liquid mixture of the third liquid and the liquid diluent into a solid composition which can typically be stored for an increased period of time. These processes or process steps as such and their implementation are generally known to a skilled person.

As described above, the apparatus may include a means for inline particle size measurement on the third liquid. Accordingly, a non-limiting embodiment of the method of the disclosure may be to make use of this apparatus feature and conduct a step of performing an inline particle size measurement on the third liquid before said third liquid is received by the first container. In this manner it can be ensured that an important product parameter, i.e. a targeted particle size, is actually achieved by the product in form of the third liquid as it is collected in a product container. This non-limiting embodiment is particularly relevant in the context of manufacturing small batches of liquid products that include liposomes or lipid nanoparticles.

The inline particle size measurement step may also be advantageous when working with a further non-limiting embodiment of the apparatus according to which a second container for receiving the third liquid is present. In terms of method features, this means that step (ee) may include collecting at least a further portion of the third liquid in a second container for receiving the third liquid, said second container being arranged in fluid connection with the outlet of the static mixer. The collecting of the portion or portions of the third liquid in the second container may be effected by interrupting the fluid connection between the outlet of the static mixer and the first container for receiving the third liquid.

For example, an initial portion of the third liquid as it is discharged from the static mixer through its outlet may be directed into the second container, which may function as a waste container, followed by directing a subsequent portion of the third liquid into the first container, which may function as product container. A yet further subsequent portion of the third liquid may again be directed into the second container, e.g. towards the end of a batch production. In this manner, it is possible to selectively collect a fraction of the third liquid which excludes material generated during the start-up or trailing phase of the process and which therefore represent best the targeted product quality.

In another non-limiting embodiment, the apparatus features both the arrangement including a means for inline particle size measurement and the arrangement including a first and a second container for receiving the third liquid, and also exhibits means—such as pinch valves—for reversibly interrupting the fluid connection between the outlet of the static mixer and each of the first and the second container. Furthermore, this non-limiting embodiment would also provide a means for controlling the e.g. pinch valves to interrupt or open the respective fluid connection in response to the particle size measurement.

In terms of the method of the disclosure, this apparatus arrangement and configuration may be used such that during steps (dd) and (ee), during which the mixing process is ongoing, and the third liquid is generated and discharged from the static mixing device through its outlet, the inline particle size measurement is performed. Depending on the measured particle size, the pinch valves will be operated such that there is either an open fluid connection between the outlet and the first container which is used as product container, while the fluid connection to the second container is interrupted; or that there is an open fluid connection between the outlet and the second container which is used as waste container, while the fluid connection to the first container is interrupted.

In other words, according to this non-limiting embodiment, the method includes performing inline particle size measurement on the third liquid during steps (dd) and (ee); if the inline particle size measurement gives an undesirable result, collecting the third liquid in the second container for receiving the third liquid by interrupting the fluid connection between the outlet of the static mixer and the first container for receiving the third liquid; and if the inline particle size measurement gives a desirable result, collecting the third liquid in the first container for receiving the third liquid by interrupting the fluid connection between the outlet of the static mixer and the second container for receiving the third liquid.

For example, in the initial phase of steps (dd) and (ee), the particle size measured in the third liquid may not yet fulfil the pre-set target criteria such that the first amount of the third liquid should be directed to the waste container, which is achieved by the respective settings of the pinch valves. Upon reaching the desired particle size characteristics, the settings of the valves are changed, and the third liquid is now directed into the product container.

The method of the disclosure may be used, for example, for making particles, such as micro- or nanoparticles of poorly water-soluble compounds by flash precipitation. For this purpose, one of the liquid substrates, for example the first liquid, may include an organic solution of the poorly soluble compound in a water-miscible solvent or solvent mixture; and the second liquid may represent an aqueous solution, such that the mixing of the two liquids according to the disclosure results in the precipitation of the poorly soluble compound in the form of micro- or nanoparticles. Similarly, poorly soluble compounds that are ionizable may be precipitated as micro- or nanoparticles using the method of the disclosure by providing a first liquid which is an aqueous solution of the poorly soluble compound having a pH at which the compound is predominantly ionized and soluble, and a second liquid which represents an aqueous solution that due to its pH acts as an antisolvent to the poorly soluble compound.

In some non-limiting embodiments, the poorly soluble compound is a biologically active agent, such as a drug substance, a vaccine or a diagnostic compound. The first and/or the second liquid may include one or more polymers, and the process may be conducted such that polymeric particles including a biologically active ingredient are produced.

In a further non-limiting embodiment of the method of the disclosure, the first liquid includes an organic solution of one or more lipids; the second liquid includes an aqueous solution of a biologically active agent; such that lipid nanoparticles are formed by the mixing of the first and the second liquid, wherein the biologically active agent is associated with and/or encapsulated within the lipid nanoparticles.

More than one lipid may be used in the first liquid. For example, an organic (e.g. ethanolic) solution of a combination of lipids that are known to be useful for making lipid nanoparticles (LNPs) may be used. These lipids may include a cationic or cationizable lipid, a PEGylated lipid, a structural lipid, and cholesterol.

As used herein, and unless the context dictates otherwise, a cationic lipid is a lipid including a positive charge in an aqueous environment of any pH, such as a lipid having a quaternary nitrogen atom (i.e., an ammonium moiety); whereas a cationizable lipid is a lipid including a positive charge only in an aqueous environment of neutral or acidic pH, such as a lipid representing a primary, secondary or tertiary amine. As used herein, PEG means polyethylene glycol, and a PEGylated lipid is a lipid that is conjugated with a PEG moiety. The structural lipid may be a non-PEGylated zwitterionic lipid.

The first liquid may include a water-miscible solvent in which the lipids are dissolved. The water-miscible solvent may be selected from ethanol, methanol, acetone, acetonitrile, acetic acid, formic acid, trifluoroacetic acid, acetaldehyde, butanol, ethylamine, and any combinations thereof. In particular, the water-miscible solvent may be ethanol.

In a further non-limiting embodiment, the first liquid includes or essentially consists of a solution of the one or more lipids in a water-miscible solvent selected from ethanol, methanol, acetone, acetonitrile, acetic acid, formic acid, trifluoroacetic acid, acetaldehyde, butanol, ethylamine, and any combinations thereof. In a specific non-limiting embodiment, the first liquid composition includes or essentially consists of a solution of the one or more lipids in ethanol.

In some non-limiting embodiments, the first liquid composition includes:

from 40 to 60 mol % of a cationic or cationizable lipid;

from 0.5 to 2 mol % of a PEGylated lipid;

from 5 to 20 mol % of a non-PEGylated zwitterionic lipid; and from 30 to 50 mol % of cholesterol;

wherein the percentages are based on the total content of lipids in the first liquid.

If the method is used to prepare lipid nanoparticles, the biologically active agent may be an oligo- or polynucleotide. According to another non-limiting embodiment, the oligo- or polynucleotide may be a modified mRNA molecule including a nucleic acid sequence encoding an antigen, in particular a tumor antigen, a viral antigen, a bacterial antigen, a fungal antigen, or a protozoal antigen.

A particular advantage of the method according to the disclosure is that it enables the quick and flexible manufacture of small batches under aseptic conditions, for example, using the apparatus described herein. After the manufacture of a batch, the apparatus is easily reconfigured and prepared for the manufacture of another batch of the same or a different material. No pumps are involved when causing the first and the second liquid to flow, mix and form the third liquid. There are no or only few structures with direct product contact, and these may be easily replaced. Those parts that require sterilization before the manufacture of a batch are easily sterilized.

The method of the disclosure may further include a step of sterilizing the static mixer before step (dd) is conducted, i.e. before pressurizing the first and the second pressurizable chamber such as to force said first and said second liquid through the static mixer and to cause the mixing of the two liquid substrates. The sterilization may be performed with any sterilization method that is compatible with the material from which the mixing device is made. For example, sterilization may be performed with steam. In one of the non-limiting embodiments, sterilization is performed by gamma irradiation. This also applies in case the mixing device is made of glass or plastic, in particular if the mixing device of glass or plastic is a jet impingement reactor as described above in more detail.

In a further aspect, the disclosure provides the use of the apparatus or of the method as described above for the production of lipid nanoparticles.

DETAILED DESCRIPTION OF THE DRAWINGS

The drawings included in the present disclosure illustrate certain non-limiting embodiments relating to the apparatus provided according to the disclosure. None of the following drawings are according to scale.

FIG. 1 is a flow chart depicting the pneumatic circuitry of a non-limiting embodiment of the apparatus for operating a static mixer for mixing a first liquid and a second liquid according to the present disclosure. The apparatus includes a first feed module (11) for providing a first liquid to a first inlet of a static mixer (not shown); a second feed module (12) for providing a second liquid to a second inlet of a static mixer; and a pressure supply module (2*a*), that is arranged upstream of the first (11) and the second feed module (12). The solid arrows as depicted in the flow chart indicate the direction of flow of pressurized gas (e.g. pressurized air). Dashed lines encircle the components which are comprised by and/or contribute to the function of the pressure supply module (2*a*) and the components which are comprised by and/or contribute to the function of the first (11) and second feed module (12). Dotted lines that are drawn as a link between two features indicate electrical signal communication (e.g. instruction, feedback, or both).

The pressure supply module (2*a*) includes a gas inlet (3) for receiving pressurized gas from an upstream gas source (not depicted). The pressurized gas is directed into a pressure amplifier (7) at a specific pressure, and the pressure amplifier (7) outputs gas having a higher pressure than the gas received from the gas inlet (3). In the flow path downstream of the pressure amplifier (7), a pressure reservoir chamber (8) is arranged. The pressurized gas held in this reservoir (8) can flow further downstream towards the first (11) and second feed module (12) via a valve (21) and a flow path divider (6), which diverts the flow of the pressurized gas to the first (11) and second feed modules (12). Each of the two flow path portions downstream of the flow path divider (6) leading to the two feed modules (11, 12) independently include an electric pressure regulator, also referred to as electronic regulator (24*a*, 24*b*), for regulating the pressure of the gas that is directed into the pressure feed modules via a valve (22*a*, 22*b*) and a gas outlet (4*a*, 4*b*). As shown in the chart, the pressure supply module (2*a*) includes a central microcontroller (5) adapted for controlling at least the opening and closing of the valves (21, 22*a*, 22*b*) and the operation of the electric pressure regulators (24*a*, 24*b*). Moreover, the microcontroller (5) is adapted for receiving signals from the respective pressure sensors (16*a*, 16*b*) which are in communication with the pressure reservoir chambers (13*a*, 13*b*) of first (11) and second feed modules (12). As shown, the pressurized gas from the pressure supply module (2*a*) flows via the first (4*a*) and second gas outlet (4*b*) into the first (11) and second feed module (12); for example, as in the present case, into the pressure reservoir chambers (13*a*, 13*b*) which are arranged at the upstream ends of the respective feed modules (11, 12). The valves (23*a*, 23*b*) situated between the pressure reservoir chambers (13*a*, 13*b*) and the respective substrate chambers (14*a*, 14*b*) function as means for reversibly interrupting fluid communication between the respective reservoir chamber (13*a*, 13*b*) and the substrate chamber (14*a*, 14*b*). They may also be operated by the microcontroller (5). The pressure sensor (16*a*, 16*b*) of each pressure supply module (2*a*, 2*b*) senses the gas pressure at the corresponding pressure reservoir chamber (13*a*, 13*b*) and is configured to transmit its electrical signals to the microcontroller (5), which is configured to control the pressure provided by the pressure supply modules (2*a*, 2*b*) to the first (11) and second feed module (12).

FIG. 2 is a flow chart depicting the pneumatic circuitry and components of another non-limiting embodiment of the apparatus (1). Again, a pressure supply module (2*b*) and a first (11) and second feed module (12) are provided. The pressure supply module (2*b*) is configured to deliver pressurized gas individually to the feed modules (11, 12) such that each feed module (11, 12) may be operated at an individually selected operating pressure.

The pressure supply module (2*b*) includes a gas inlet (3) which is reversibly connectable to a source of pressurized gas (not shown); a first gas outlet (4*a*) for supplying pressurized gas to the pressure reservoir chamber (13*a*) of the first feed module (11); a second gas outlet (4*b*) for supplying pressurized gas to the pressure reservoir chamber (13*b*) of the second feed module (12); a flow path (solid arrows) for pressurized gas to flow from the gas inlet (3) to the first (4*a*) and/or second gas outlet (4*b*), the flow path including a flow path divider (6); a first and a second pressure amplifier (7*a*, 7*b*) arranged in portions of the flow path that are downstream of the flow path divider (6). A flow path diversion is arranged for circumventing each of the two pressure amplifiers (7*a*, 7*b*), with a check valve (9*a*, 9*b*) being arranged in the flow path diversion. The pressure in each downstream portion of the flow path which is delivered to the first (4*a*) and second gas outlet (4*b*) is individually controllable by electric pressure regulators, also referred to as electronic controllers (24*a*, 24*b*), and valves (21*a*, 22*b*) arranged upstream and downstream of the pressure amplifiers (7*a*, 7*b*), together and in combination with a microcontroller (5) forming a first and second pressure control circuit. The electric signals that represent the input parameters of the control circuits are provided by a first (16*a*) and a second pressure sensor (16*b*), which sensors are arranged for sensing the gas pressure in the first (11) and second feed module (12), for example in the respective pressure reservoir chamber (13*a*, 13*b*).

Each of the first (11) and the second feed module (12) independently includes: a pressure reservoir chamber (13*a*, 13*b*) for holding pressurized gas received from the respective gas outlet (4*a*, 4*b*) of the pressure supply module (2*b*); a pressurizable substrate chamber (14*a*, 14*b*) for holding a flexible container having an interior space for holding a liquid substrate (not shown); a connector (not specifically shown, but functionally indicated by solid arrows) for providing fluid communication and permitting a flow of pressurized gas between the pressure reservoir chamber (13*a*, 13*b*) and the pressurizable substrate chamber (14*a*, 14*b*); and a valve (23*a*, 23*b*) as a means for reversibly interrupting the fluid communication between the pressure reservoir chamber (13*a*, 13*b*) and the respective pressurizable substrate chamber (14*a*, 14*b*). The already mentioned pressure sensors (16*a*, 16*b*) are adapted to sense the gas pressure in the first (11) and second feed module (12) at the respective pressure reservoir chamber (13*a*, 13*b*), and to transmit electric signals to the microcontroller (5).

Figure 3:
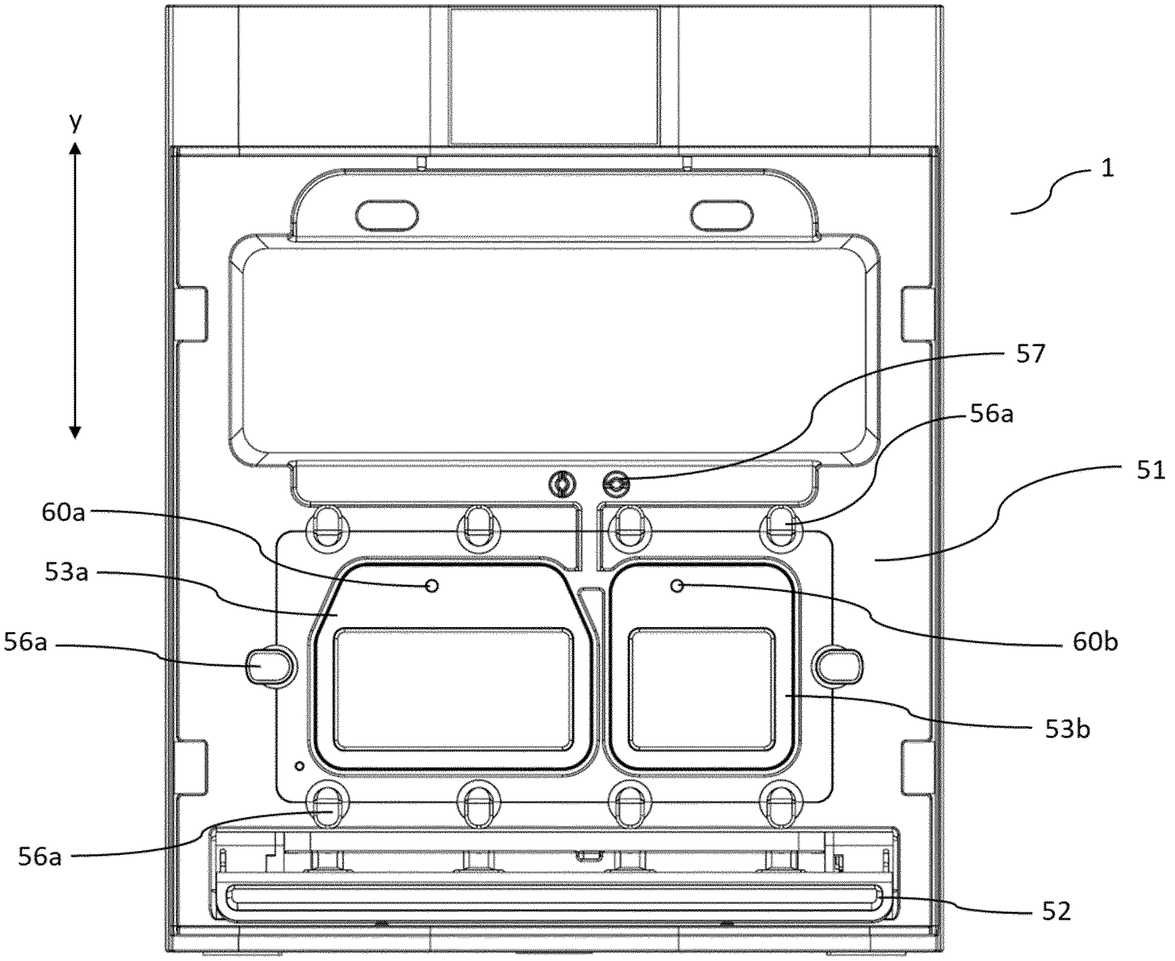
FIG. 3 depicts a front view of an apparatus (1) in its operating orientation.

FIG. 3 depicts a front view, or view of the user facing side, of an apparatus (1) according to the present disclosure. The apparatus (1) is depicted in its operating orientation, which is vertical, i.e. parallel to a vertical axis (y). As shown, the apparatus (1) includes a first counterpiece (51) featured as part of the main body of the apparatus. The first counterpiece (51) includes a first cavity (53*a*) and a second cavity (53*b*), respectively including a first gas outlet (60*a*) and a second gas outlet (60*b*) of a second pressure supply module such as described and depicted in FIGS. 1 and 2. Other features of the pressure supply module are arranged at the back of the apparatus (not shown).

The first and second cavities (53*a*, 53*b*) are configured to correspond with respective first and second cavities (not shown here, see FIG. 4) of the second counterpiece (52). Moreover, said first and second cavities (53*a*, 53*b*) are adapted to be sealed independently by a circumferential gasket (not shown), which may be affixed encircling or surrounding the cavities, or alternatively to a frame as further described herein, such as described in respect to FIG. 6. The first and second cavities (53*a*, 53*b*) are furthermore independently adapted and shaped to at least partially hold or accommodate any one or combination of the following (not shown, but see FIGS. 5 and 6): a flexible substrate container and its associated features (e.g. a port) at least one conduit, a portion of a frame adapted for holding aforementioned components, a portion of a static mixer or a connecting piece associated with a static mixer, or an insert, such as described in FIG. 5. With respect to the location of the first and second gas outlet (60*a*, 60*b*), these are featured as depicted in the current non-limiting embodiment, in the context of the vertical operating orientation position of the apparatus (1), near the top portion of the cavities (53*a*), and (53*b*). In reference to the positioning and accommodation of a flexible container (ref. FIG. 6), the gas outlets (60*a*, 60*b*) which are provided for delivering pressurized gas may be provided by the apparatus (1) and arranged on the first counterpiece (51) and at a position selected such that the first point of contact of the pressurized gas flow exiting the outlet during operation of the apparatus is not an external surface of a flexible substrate bag.

As further shown in the present Figure, a second counterpiece (52) is hingingly connected to the first counterpiece (51) of the apparatus (1). The apparatus (1) also includes a series of fastening means (56*a*), such as in the form of rotatable clamps which are arranged on the first counterpiece (51) peripherally around the first (53*a*) and second cavities (53*b*). In some non-limiting embodiments, such as the currently depicted non-limiting embodiment, at least five fastening means (56*a*) are arranged peripherally around each of the first and second cavities, i.e. a total of 10 clamps, with four arranged in a row along an axis perpendicular with respect to the vertical operating orientation (y) of the apparatus, near the top of the cavities (53*a*, 53*b*), four arranged in parallel below the two cavities (53*a*, 53*b*), one arranged to the left of the first cavity (53*a*) and one arranged to the right of the second cavity (53*b*). These clamps correspond to a complementary fastening means (not shown, see FIG. 4) featured on the second counterpiece (52). Rotating clamps may provide a secure means to lock-in the first and second counterpieces together during operation of the apparatus and under high pressure conditions. The apparatus (1) furthermore includes as depicted, two valve actuators (57), to which valves (e.g. one-way stopcock valves), which may be useful for the process of mixing or to the process of collecting the resulting mixed or reacted product, may be affixed and actuated.

Figure 4:
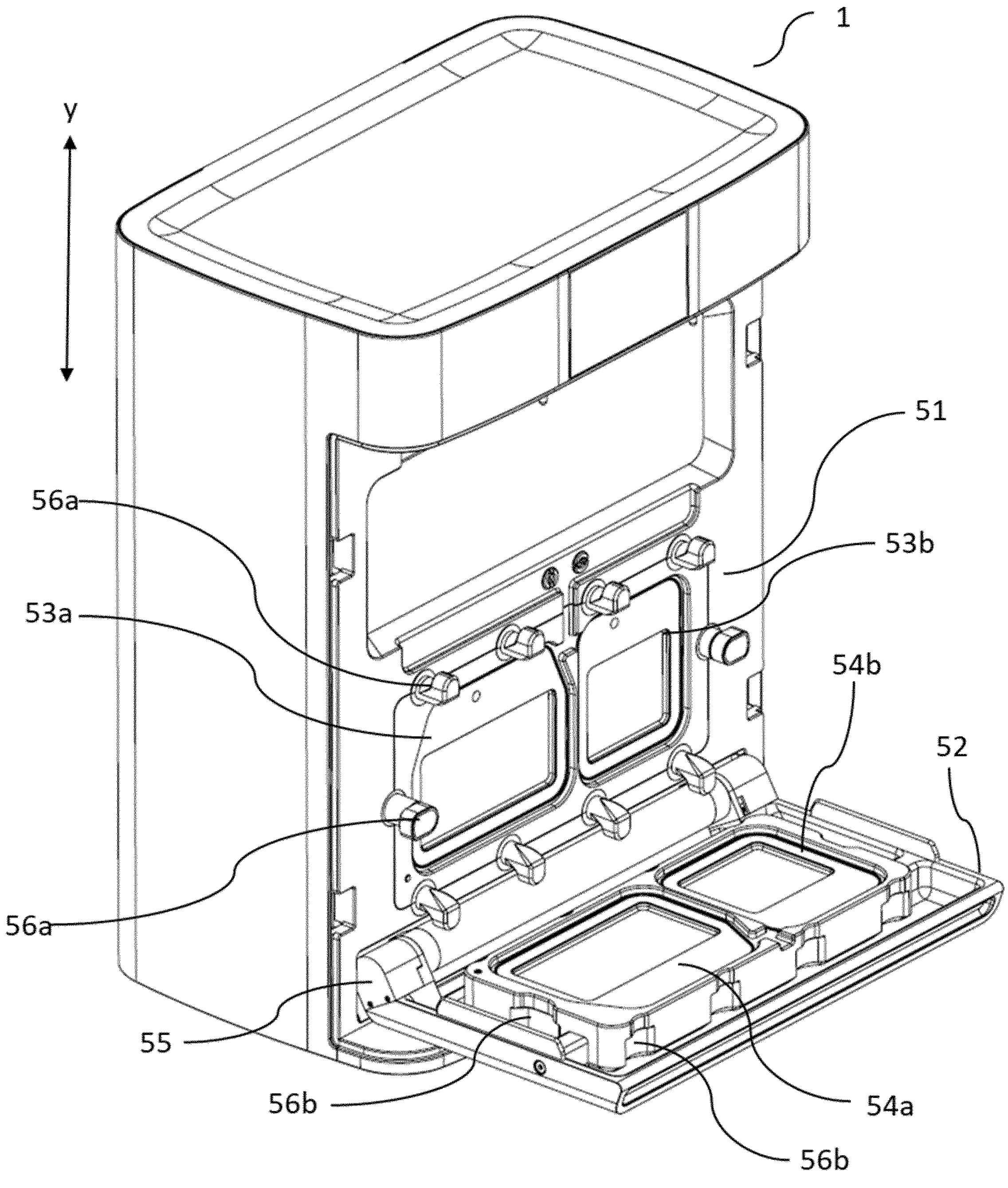
FIG. 4 depicts a perspective view of the apparatus (1) as shown in FIG. 3.

FIG. 4 depicts a perspective view of the apparatus (1) as shown in FIG. 3, not drawn to scale and also shown in its operating orientation which is parallel with respect to a vertical axis (y). As shown, the second counterpiece (52) of the apparatus is rotatable and hingingly connected via a pivotable hinge (55) to the first counterpiece (51) which is part of the main body of the apparatus (1) and configured to complementarily append to the first counterpiece (51) including a first (53*a*) and second cavity (53*b*). The second counterpiece moreover includes complementary fastening means (56*b*) in the form of grooves complementary to the fastening means (56*a*) located on the first counterpiece (51), which are in the form of rotatable clamps. The second counterpiece (52) moreover includes a first cavity (54*a*) and a second cavity (54*b*), which match and correspond respectively to the first cavity (53*a*) and second cavity (53*b*) of the first counterpiece (51). Said cavities (54*a*, 54*b*) are adapted to be sealed independently by a circumferential gasket (not shown), which may be affixed such as to encircle the cavities, or alternatively to a frame as further described herein, such as described in respect of FIG. 6. In addition to being complementary to the cavities (53*a*, 53*b*) of the first counterpiece (51), the first and second cavities (54*a*, 54*b*) of the second counterpiece (52) are furthermore each independently adapted and shaped to at least partially hold or accommodate any one or combination of the following (not shown, but see FIGS. 5 and 6): a flexible substrate container and its associated components (ports), at least one conduit, a portion of a frame adapted for holding aforementioned components, a portion of a static mixer or a connecting piece associated with a static mixer, or an insert, such as described in FIG. 5. Other features of the apparatus (1) such as described in FIG. 1 or 2 (not shown) are arranged in the housing or main body of the apparatus behind first counterpiece.

Figure 5:
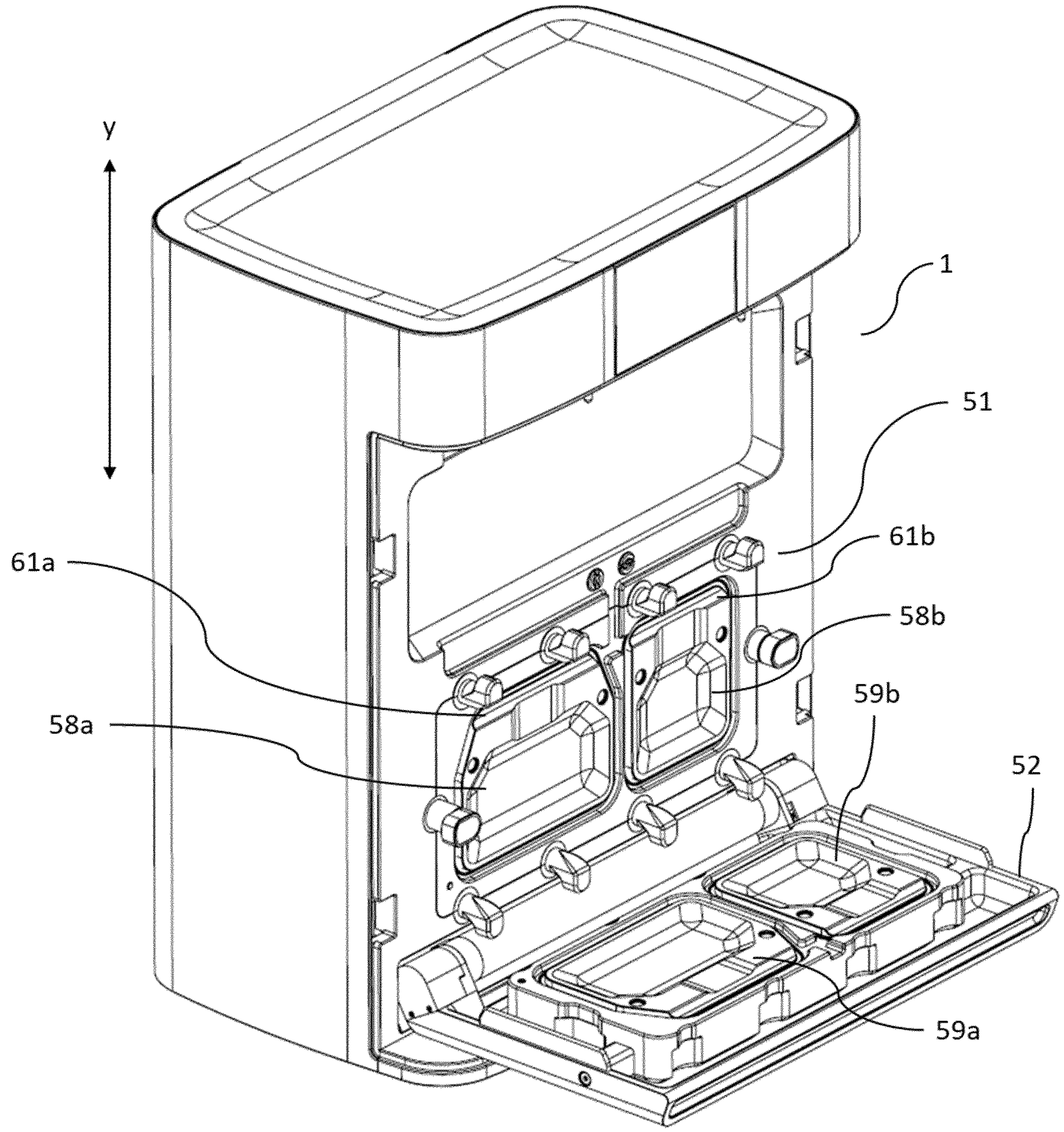
FIG. 5 depicts a perspective view of the apparatus (1) as shown in FIG. 4 fitted with inserts (58*a*, 58*b*, 59*a*, 59*b*).
Figure 6:
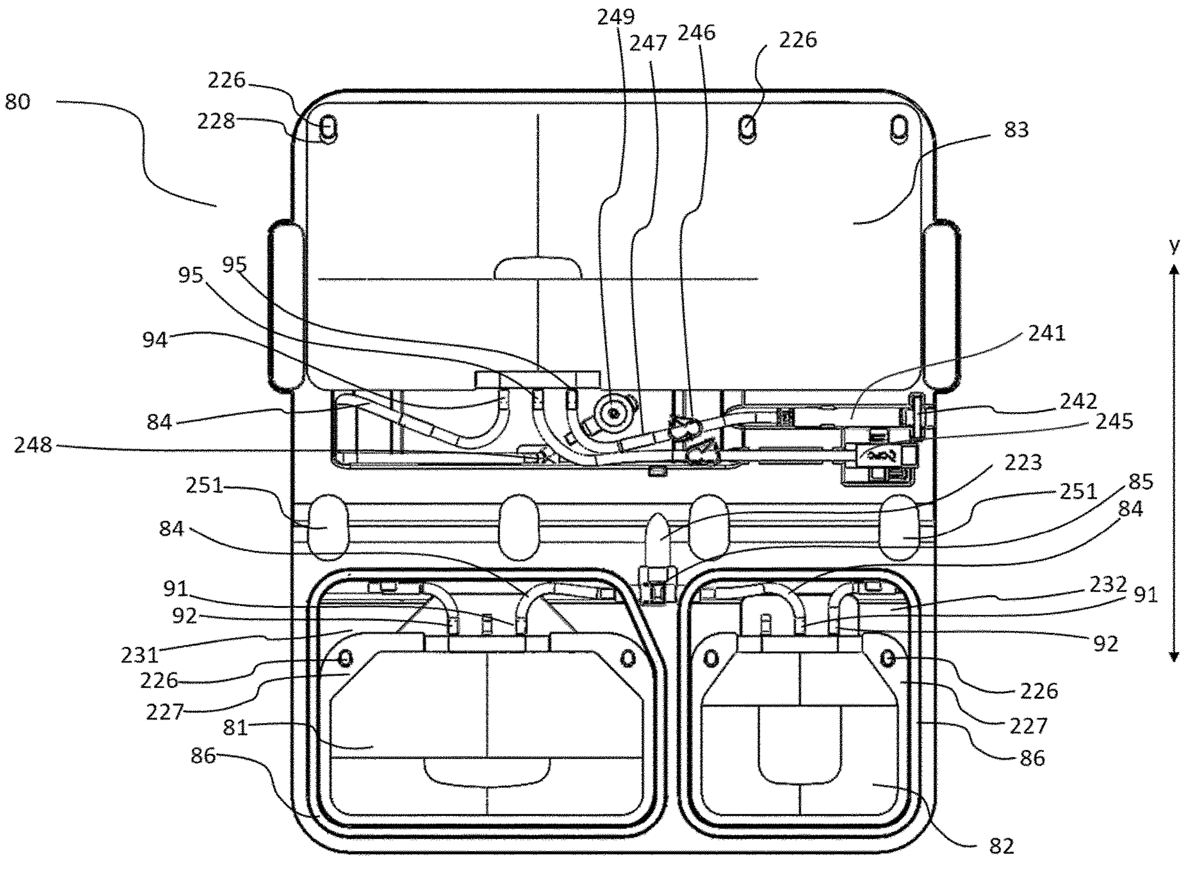
FIG. 6 depicts a front view of an example of a frame (80) which is configured for use with the apparatus (1), the frame including a static mixer assembled with other components as provided for the mixing of a first and second liquid.

FIG. 5 depicts the same perspective view of the apparatus (1) as shown in FIG. 4, wherein a first (58*a*) and a second insert (58*b*) has been fitted into the first and second cavity of the first counterpiece (51), respectively, and wherein a first (59*a*) and a second insert (59*b*) has been fitted into the first and second cavity of the second counterpiece (52) of the apparatus (1), respectively. The inserts (58*a*, 58*b*; 59*a*, 59*b*) provide means not only to shape the cavity to fit a respectively shaped or sized flexible substrate container (not shown, but see FIG. 6), ensuring containment and holding in place of the container during pressurization, but also as a means for reducing the volume of the cavity, and as such, the overall volume to which the pressure supply module has to feed pressurized gas. In some non-limiting embodiments, said inserts are not fitted sealingly to the cavity, but only in a manner which permits them to be secured; or in other words, with placement of the inserts into the cavities, pressurized gas may still diffuse through or between the contact surfaces of the cavity and insert.

The inserts (58*a*, 58*b*, 59*a*, 59*b*), even though they are not shown as to scale, may fill a substantial part of the space or volume of the respective cavities into which they are inserted and include at least one depression adapted to hold at least a portion of a flexible substrate container (and its associated ports), and in another non-limiting embodiment, also at least one conduit. As shown, the inserts (58*a*, 58*b*) adapted for the first counterpiece (51) cover the first and second gas outlet (60*a*, 60*b*) of the pressure supply module, however, a means for diffusing the pressurized gas (61*a*, 61*b*) is provided at the top (relative to the operating orientation of the device) of the insert, simply in the form of a cut-out or a recess, resulting in a non-covered portion of the cavity, through which pressurized gas may diffuse. The insert (58*a*, 58*b*), by providing a cover over the first and second gas outlet (60*a*, 60*b*), respectively, may provide an additional technical function with respect to reducing or obviating the occurrence of any undesirable pressurized gas impacting the external surface flexible substrate container and/or potentially sensitive connection points between the ports of the bag and a conduit. In other non-limiting embodiments, the insert does not include any means for diffusion of the pressurized gas and may still cover the respective gas outlets (60*a*, 60*b*), but as noted above, as the inserts are not sealingly affixed or fitted into the cavities, the pressurized gas may still be able to channel or diffuse in between negative space between fit of the insert and its respective cavity.

The pressurizable substrate chambers may be formed by affixing the second (52) to the first counterpiece (51), by which the first cavity of the first counterpiece (51) is aligned with the first cavity of the second counterpiece (52) and the second cavity of the first counterpiece (51) with the second cavity of the counterpiece (52). The inserts function to reduce the volume in said chambers which would be required to be filled by the pressurized gas introduced from the pressure supply module. This provides for an improved efficiency for the process of pressurization with respect to the performance of the methods according to the present disclosure. In some non-limiting embodiments, the insert is simply fitted into the cavity, in other non-limiting embodiments, the insert is affixed or fastened (e.g. screwed) into the cavity by a fastening means (not depicted). It may be envisioned that alternative inserts from the ones depicted may be utilized, for example, in adaptation to a different size or shape of flexible substrate container used in a method according to the disclosure with respect to the mixing of two fluid substrates, depending on the desired production scale. In some non-limiting embodiments, the first insert (58*a*) of the first counterpiece (51) and the first insert (59*a*) of the second counterpiece (52) may be the same i.e. are identical inserts, likewise in respect to the second inserts (58*b*, 59*b*). In other non-limiting embodiments, the first and second inserts (58*a*, 58*b*) used for the cavities of the first counterpiece (51) may be different from their counterparts in the second counterpiece.

FIG. 6 depicts the front view of the front side, or user-facing side, of a frame (80), not drawn to scale, which is configured and adapted for use with an apparatus (1) according to the present disclosure, such as an apparatus similar to the apparatus (1) as described in FIGS. 3 to 5.

The frame (80) is shown in its operating orientation, which is vertical, and parallel with a vertical axis (y). The frame (80) is assembled with and holds at least the following components: flexible containers (81, 82, 83), conduits (84) and a static mixing device (85). The frame (80) includes a first (231) and second (232) sealable region for holding or accommodating a first and a second flexible substrate container (81, 82). The sealable regions (231, 232) are enclosed by circumferential gaskets (86). The first sealable region (231) and the second sealable region (232) are positioned to be adjacent to one another, and the dimensions and arrangement of these regions, as well as the circumferential gaskets (86) correspond to respective first and second cavity of the second counterpiece of an apparatus (1) according to the present disclosure. On the backside of the frame (80), which is not depicted, the sealable regions (231, 232) likewise correspond to a first and second cavity of the first counterpiece of said apparatus. Within the sealable regions (231, 232), the first and second flexible substrate container (81, 82) are held by means (226) for affixing them in their designated position. The means (226) are connectable with corresponding through-holes (cf. 228) in the peripheral zone or sealed edge (227) of the respective flexible container. Each flexible substrate container (81, 82) has three ports, including an outlet port (91) and a sealed inlet port (92). The outlet ports (91) are fluidically connected via conduits (84) with a static mixing device (85), which is held in place by a means (223) for holding it. Moreover, the outlet ports (91) are arranged at the top of the substrate containers (81, 82) such that the fluid substrates or liquids (not shown) held therein would exit the substrate containers (81, 82) in an anti-gravity direction in order to flow to the static mixing device (85).

Also shown is a flexible product container (83) arranged on the front side and towards the top of the frame (80, held by three affixing means (226) whose positions correspond with three through-holes (228) provided in a peripheral zone of the product container (83). It is noted that a flexible waste container may also be assembled to the frame (80) but this cannot be seen as it is affixed to the back side of the frame. The product container (83) has three ports arranged at its bottom side (in its operating orientation) including an inlet port (94) for receiving the third fluid from the static mixing device (85) via a conduit (84), and two outlet ports (95). One of the outlet ports (95) is fluidically connected via a flexible tube to a sampling tube (241), whose downstream end is fluidically connected with a sterile filter (242); upstream of the sampling tube (241), a pinch valve (246) and an aseptic disconnector (247) are arranged for facilitating the withdrawal of a product sample. The other outlet port (95) is fluidically connected via a flexible tube to an aseptic connector (245). Also shown is a further sterile filter (249) which is in fluidic connection with the inlet port of the product container via a Y-piece (248). This arrangement may be used for adding diluent before, during or after the mixing process to the product container (83) such as to dilute or change the composition of the third fluid received from the static mixing device (85). The frame (80) further includes four through-holes (251) in a central region that enable it to be affixed to an apparatus according to the present disclosure, and/or to allow a protruding fastening or locking means featured on the first counterpiece of the apparatus to access the corresponding fastening or locking means on the second counterpiece of the apparatus when the apparatus is in operation.

When the frame (80) is affixed or held in place on an apparatus according to the present disclosure, for example by affixation or holding means present on the apparatus such as one or more hooks, and all the described components are assembled such as depicted in the present Figure, the second counterpiece, which may be rotatable and hingingly connected to the first counterpiece, may be affixed to and sealingly brought together with the first counterpiece with the frame (80) including at least one circumferential gasket arranged to seal each of the respective first cavities and second cavities both against the first and the second counterpiece. Thus, the first and second cavities of the two counterpieces may separately seal to form a first and second pressurizable substrate chamber of the respective feed module of the apparatus.

While the specific non-limiting embodiment as depicted in the current figure of the frame (80) has slightly different shaping with respect to the first sealable region (231) as compared to the shaping of the corresponding respective first cavities (53*a*, 54*b*) of the first (51) and second counterpiece (52) of the apparatus (1) as shown in FIGS. 3 to 5, it will be appreciated by the skilled person, that a frame provided or adapted with a correspondingly shaped sealable region may be devised for use in conjunction with the apparatus non-limiting embodiments as shown in FIGS. 3 to 5.

Figure 7:
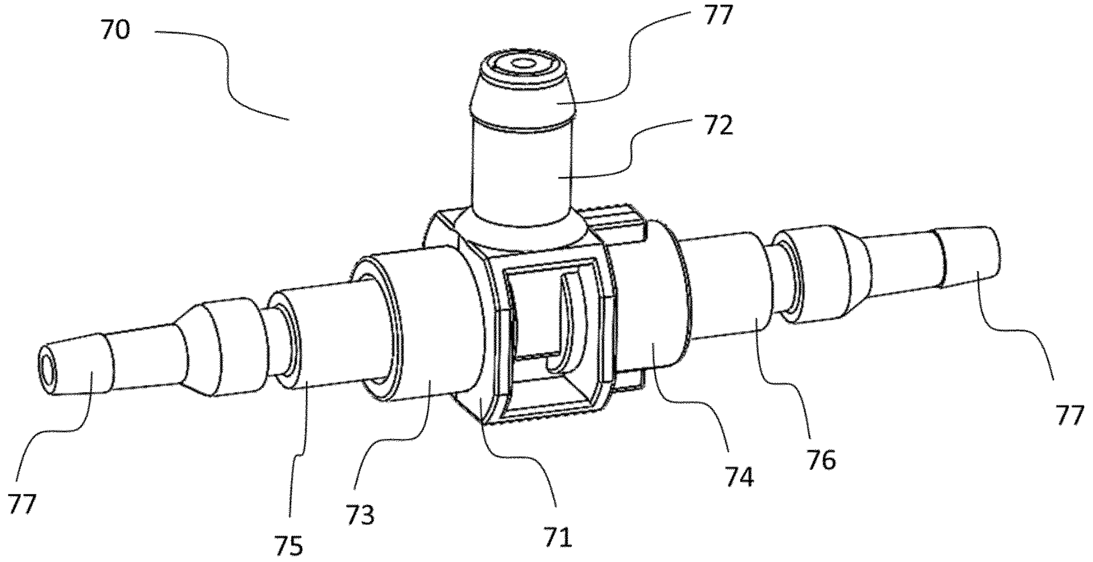
FIG. 7 depicts a perspective view of an exemplary static mixing device (70).

FIG. 7 depicts a perspective view of an exemplary static mixing device (70) as may be used in combination with the frame (80), and to which the apparatus according to the present disclosure is adapted to operate for the mixing of a first liquid and second liquid.

The static mixing device (70) may, according to some non-limiting embodiments, represent a jet impingement reactor. The mixing device (70) as shown includes a main housing (71) with an outlet port (72) and a first and second inlet port (73, 74). In this case, the static mixing device (70) is shown in its operating orientation in that the outlet port (72) points upward such that a third fluid formed from the mixing of a first and second liquid, and exiting the outlet port (72) would flow in an anti-gravity direction. A first and second inlet connecting piece (75, 76) are fitted in the first and second inlet port (73, 74), respectively. Barbed connectors (77) are provided at the upstream ends of the connecting pieces (75, 76) and at the downstream end of the outlet port (72).

Figure 8:
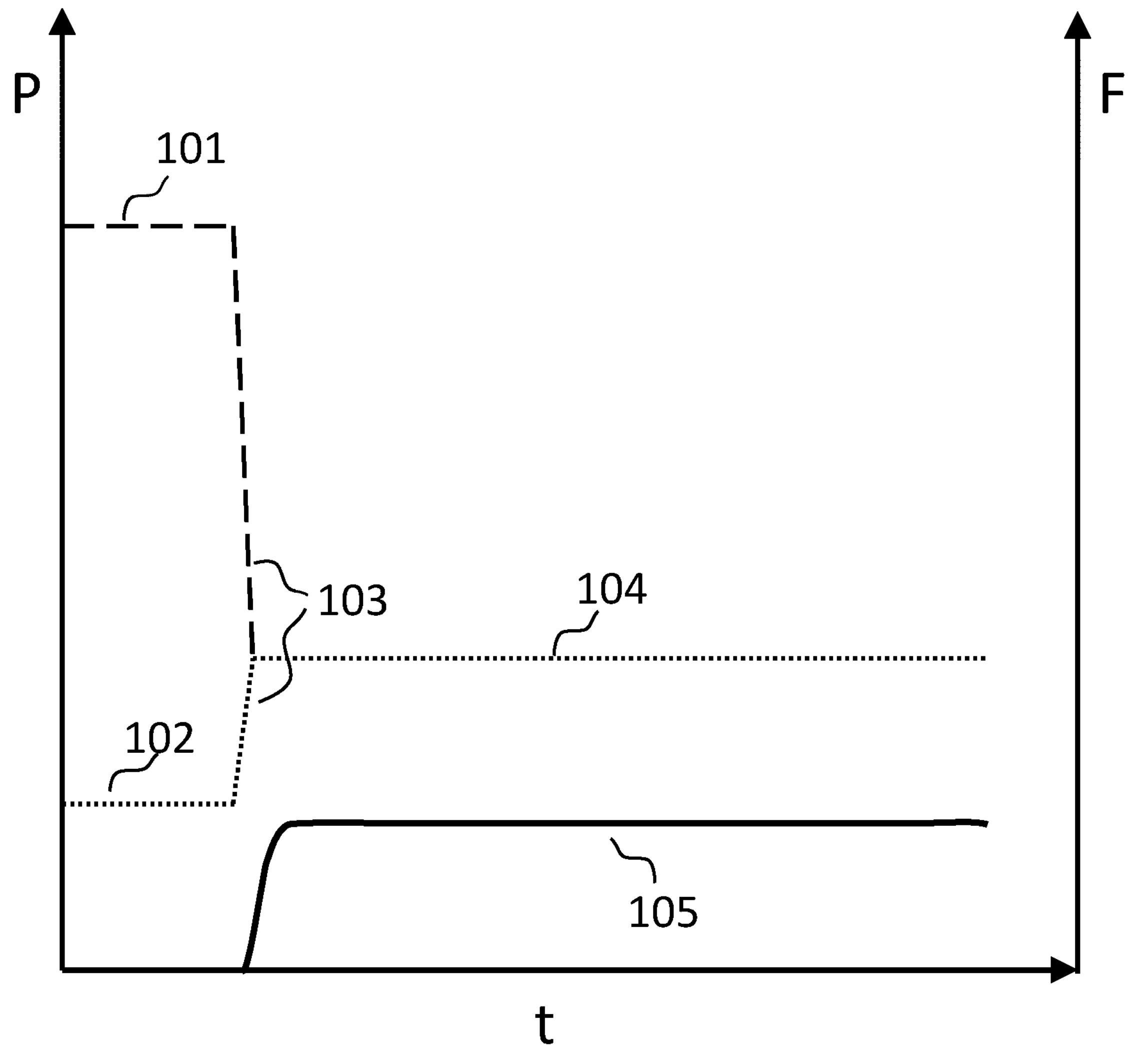
FIG. 8 depicts a schematic illustration of a typical overall relationship between the pressure (P) in a pressure reservoir chamber, the pressure (P) in a corresponding pressurizable substrate chamber, and the flow rate (F) of a liquid as it is forced out from a flexible container accommodated in the substrate chamber over time (t) when conducting the method of the disclosure according to some non-limiting embodiments.

FIG. 8 shows a schematic illustration of a typical overall relationship between the pressure (P) in a pressure reservoir chamber, the pressure (P) in a corresponding pressurizable substrate chamber, and the flow rate (F) of a liquid as it is forced out from a flexible container accommodated in the substrate chamber over time (t) when conducting the method of the disclosure according to some non-limiting embodiments. The figure is not to scale and only uses arbitrary units. Initially, i.e. before conducting step (dd) of the method, the pressure (101) in the pressure reservoir chamber which contains a pressurized gas is substantially higher than the pressure (102) in the corresponding pressurizable substrate chamber holding a flexible container filled with a liquid substrate. During this phase, the respective means for reversibly interrupting the fluid communication between the pressure reservoir chamber and the substrate chamber is in its closed state, and the pressure (102) in the substrate chamber may be the same as, or close to, ambient pressure. Step (dd), which may be initiated by changing the state of the means for reversibly interrupting the fluid communication between the pressure reservoir chamber and the substrate chamber from closed to open, which will cause an abrupt or rapid pressure equilibration (103), e.g. within less than 2 or 3 seconds, between the pressure reservoir chamber and the substrate chamber. It is noted that this pressure equilibration involves an abrupt decrease of the pressure in the pressure reservoir chamber and an abrupt increase of the pressure in the corresponding substrate chamber, which is now above the ambient pressure level. The now increased pressure (104) in the pressurizable substrate chamber, i.e. the equilibrium pressure, or target process pressure, which acts on an external surface of the flexible container holding the liquid, now forces the liquid to flow out from the flexible container towards the static mixer at a substantially constant flow rate (105). During the flow of the liquid, further pressurized gas may be introduced to feed module including the pressure reservoir chamber and the pressurizable substrate chamber such that the target process pressure is maintained until the mixing process is substantially completed. However, even without supplying additional pressurized gas during the mixing process, the pressure (104) in the pressurizable substrate chamber after equilibration would remain nearly constant as the volume of the liquid flowing out from the flexible container is relatively small compared to the total volume of the pressure reservoir chamber and the pressurizable substrate chamber.

Depending on certain process parameters or on the type and sensitivity of pressure or flow sensors for measuring the pressure (P) and the flow rate (F), minor deviations from the overall shape of the graphs depicted in FIG. 9 might be observed when using the apparatus or conducting the process according to the disclosure. For example, during the abrupt pressure equilibration (103), very short initial peaks may be observed for the pressure (102) in the substrate chamber or for the flow rate (105), e.g. if the fluid paths upstream of the static mixing device are prefilled with liquid. Such short peaks may be interpreted as initial pulses or "shock waves" that travel through the liquid. They do not change the overall characteristics of the process. Moreover, a very minor decrease or increase of the pressure (104) in the substrate chamber after abrupt equilibration over time might be observed. A minor decrease could, for example, result from the small increase of the volume of the pressurized gas in the substrate chamber, whereas a minor increase could result from a small temperature increase of the pressurized gas during the process. The inventor have found, however, that processes with extremely fast onset of liquid flow and highly controlled pressure can be conducted when using an apparatus as described herein, such as an apparatus with a pressure supply module as outlined in FIG. 1 or 2.

LIST OF REFERENCE NUMBERS

1 Apparatus
2*a*, 2*b* Pressure supply module
3 Gas inlet of the pressure supply module
11 First feed module
12 Second feed module
13*a* Pressure reservoir chamber of the first feed module
13*b* Pressure reservoir chamber of the second feed module
14*a* Pressure substrate chamber of the first feed module
14*b* Pressure substrate chamber of the second feed module
15*a*, 15*b* Valve as a means for reversibly interrupting fluid communication

16*a* Pressure sensor for the first feed module
16*b* Pressure sensor for the second feed module
4*a*, 60*a* First gas outlet of the pressure supply module
4*b*, 60*b* Second gas outlet of the pressure supply module
5 Microcontroller
6 Flow path divider
7, 7*a*, 7*b* Pressure amplifier
8 Pressure reservoir chamber of the pressure supply module
21, 21*a*, 21*b* Valve
22*a*, 22*b* Valve
9*a*, 9*b* Check valve
23*a*, 23*b* Valve
24*a*, 24*b*, 25*a*, 25*b* Electronic regulator
51 First counterpiece
52 Second counterpiece
53*a* First cavity of the first counterpiece
53*b* Second cavity of the first counterpiece
54*a* First cavity of the second counterpiece
54*b* Second cavity of the second counterpiece
55 Hinge
56*a*, 56*b* Fastening means
57 Valve actuator
58*a* Insert for the first cavity of the first counterpiece
58*b* Insert for the second cavity of the first counterpiece
59*a* Insert for the first cavity of the second counterpiece
59*b* Insert for the second cavity of the second counterpiece
61*a*, 62*b* Means for the diffusion of pressurized gas
80 Frame
81, 82, 83 Flexible containers
84 Conduits
70, 85 Static mixing device
86 Circumferential gasket
91 First or second flexible substrate container outlet port
92 First or second flexible substrate container inlet port
93 Flexible waste container inlet port
94 Flexible product container inlet port
95 Flexible product container resealable outlet port
96 Static mixing device first inlet port
97 Static mixing device second inlet port
98 Static mixing device outlet port
231 First sealable region
232 Second sealable region
223 Means for holding the static mixing device
226 Means for affixing flexible substrate, product or waste container
228 Through-hole in the peripheral zone of flexible container
227 Sealed edge of flexible substrate, product or waste container
241 Sampling tube
242 Sterile filter
245 Aseptic connector
246 Pinch valve
247 Aseptic disconnector
248 Y-piece
249 Sterile filter
251 Through-hole for a matching hook or for a fastening means of the apparatus
71 Main housing of static mixing device
72 Outlet port of static mixing device
73 First inlet port of static mixing device
74 Second inlet port of static mixing device
75 First inlet connecting piece
76 Second inlet connecting piece
77 Barbed connectors
101 Pressure in pressure reservoir chamber before equilibration
102 Pressure in pressurizable substrate chamber before equilibration
103 Rapid pressure equilibration
104 Pressure in pressurizable substrate chamber and pressure reservoir chamber after equilibration
105 Phase of constant flow rate
P Pressure
F Flow rate
t Time The following examples serve to illustrate the disclosure, however, should not be understood as restricting the scope of the claims.

EXAMPLES

Example 1

A prototype apparatus according to the disclosure was assembled and tested. The non-optimized apparatus (non-optimized e.g. with respect to minimal dead volumes) comprised, as a static mixer, a jet impingement reactor as described in co-pending European patent application 21192535.9 or in the international patent application WO 2023/025736. The substantially spherical reaction chamber had a diameter of 5 mm, and the first and the second inlet were each provided by a plain orifice nozzle having a pinhole diameter of 200 μm. Water was used as surrogate for both the first and the second liquid. The water was provided in two flexible containers, similar to infusion bags, and placed into the first and the second substrate chamber, respectively. The internal volume of the substrate chambers was approx. 10 L and the volume of water in each flexible container was approx. 500 mL. The first and the second pressure reservoir chamber each had a volume of about 20 Land was filled with pressurized air at a pressure of 15 bar. Moreover, the jet impingement reactor and the conduits for providing fluid communication between each of the two flexible containers and the respective inlet of the jet impingement reactor were pre-filled with water. The apparatus was further equipped with flow meters (Cori-Flow™) arranged in fluid conduits between the interior space of the flexible containers and the first or the second inlet of the jet impingement reactor, respectively, and with various pressure sensors.

By simultaneously opening magnetic valves positioned in the connectors between the pressure reservoir chambers and the corresponding substrate chambers, instant pressure equilibration between the pressure reservoir chambers and the corresponding substrate chambers was achieved. Pressure values were recorded once per second, and it was observed that already one second after opening the valves, an initial equilibrium pressure of about 9 bar was obtained in each substrate chamber. Until the end of the test run which lasted 43 seconds, the equilibrium pressure slightly rose to about 10 bar in each substrate chamber, probably due to a minor temperature increase during this phase. At each point in time, the pressure in the first substrate chamber was practically identical to that in the second substrate chamber.

Pressure equilibration immediately triggered the flow of water out of the flexible containers in the substrate chambers in a downstream direction, i.e. towards and through the jet impingement reactor. The flow rates were rather constant starting from about two seconds after the initial pressure equilibration: The flow rate in the first feed module increased only very slightly and evenly from about 53 to about 54 mL/min, and in the second feed module from about 54 to about 55 mL/min. In the first one or two seconds, a flow rate peak was observed which was considered an artifact caused by the initial pressure impulse traveling through the water-filled system. The very minor difference between the two feed modules is likely to be caused by minimal pinhole differences due to manufacturing tolerance, whereas the slight and technically rather negligible increase of the flow rates over time may result from the corresponding increase in pressure.

In summary, the experiment demonstrates that the apparatus is suitable to achieve an almost instant onset of flow of two liquids from flexible substrate containers into a static mixing device followed by highly controlled flow rates and flow rate ratios between the flow rates. It also demonstrates that small-scale mixing of two liquids without pumps may be performed using the apparatus.

Example 2

A similar prototype apparatus as in Example 1 was used for mixing two model liquids which upon mixing lead to the formation of solid barium sulphate particles, except that the reaction chamber of the jet impingement reactor had a diameter of 3 mm. The first liquid consisted of about 500 mL of an aqueous solution of barium chloride, and the second liquid was about 500 mL of an aqueous solution of barium sulphate. The two liquids were provided in flexible bags which were placed into a first and a second substrate chamber having a volume of about 10 L, respectively. The first pressure reservoir chamber had a volume of 20 L and was filled with pressurized air up to a pressure of 10.9 bar. The second pressure reservoir chamber also had a volume of 20 L and was pressurized with air to 6.1 bar. Connectors between the first pressure reservoir chamber and the first substrate chamber and between the second pressure reservoir chamber and the second substrate chamber were equipped with solenoid valves. Upon simultaneously opening the valves, substantially instant pressure equilibration between each pressure reservoir chamber and the therewith connected substrate chamber was observed: For the first feed module (i.e. with the first pressure reservoir chamber and the first substrate chamber), a pressure of 7.2 bar was recorded, for the second feed module (i.e. with the second pressure reservoir chamber and the second substrate chamber), the pressure was 4.6 bar. The overpressure caused the two liquids to flow from the respective flexible containers at a total flow rate (i.e. the sum of the flow rates of the first liquid stream and of the second liquid stream) of 75.5 mL/min, with a flow rate ratio between the first liquid and the second liquid of 0.73. The liquid product (i.e. the third liquid) resulting from the mixing of the first and the second liquid in the jet impingement reactor was an aqueous dispersion of barium sulphate nanoparticles having a z-average particle size of 79.4 nm and a polydispersity index of 0.14, as measured by dynamic light scattering (DLS) using a Anton Paar™ Litesizer 500.

For evaluating the reproducibility of the mixing process, the experiment was repeated twice. In both additional test runs, the instant pressure equilibration led to similar pressures as in the first experiment, and also to a comparable product with respect to the nanoparticle characteristics, as shown in Table 1, thus demonstrating a high degree of process robustness and reproducibility.

TABLE 1

| Run | $P_1$ [bar] | $P_2$ [bar] | TFR [mL/min] | FRR | z-Ave [nm] | PDI |
|---|---|---|---|---|---|---|
| 1 | 10.9/6.1 | 7.2/4.6 | 75.5 | 0.73 | 79.4 | 0.14 |
| 2 | 10.9/6.1 | 7.3/4.4 | 74.6 | 0.72 | 82.3 | 0.15 |
| 3 | 10.9/6.1 | 7.3/4.4 | 75.2 | 0.72 | 79.2 | 0.14 |

$P_1$: Pressure in pressure reservoir chambers (first/second) before equilibration; $P_2$: Pressure in pressure reservoir chambers (first/second) after equilibration; TFR: Total flow rate; z-Ave: z-average particle size; PDI: polydispersity index.

What is claimed is:

1. An apparatus configured to operate a static mixer, wherein the apparatus comprises:
- a first feed module configured to provide a first liquid to the static mixer;
- a second feed module configured to provide a second liquid to the static mixer; and
- a pressure supply module arranged upstream of the first feed module and the second feed module;
- wherein each of the first feed module and the second feed module independently comprises:
  - a pressure reservoir chamber configured to hold a pressurized gas, the pressure reservoir chamber comprising an inlet and/or an outlet for the pressurized gas;
  - respectively, a first pressurizable substrate chamber or a second pressurizable substrate chamber, each configured to hold, respectively, a first flexible container or a second flexible container;
  - a connector configured to provide fluid communication between the pressure reservoir chamber and the pressurizable substrate chamber;
  - a means for reversibly interrupting the fluid communication between the pressure reservoir chamber and the pressurizable substrate chamber, the means having an open state and a closed state;
    - wherein the connector and the means are arranged between the pressure reservoir chamber and the pressurizable substrate chamber for achieving pressure equilibration within less than 2 seconds and/or within less than about 5% of a total time required for mixing the first and the second liquid, upon changing the state of the means from closed to open; and
  - a pressure sensor configured to measure pressure of pressurized gas in the respective feed module at or downstream of the pressure reservoir chamber;
- wherein the pressure supply module comprises:
  - a gas inlet configured to be reversibly connectable to a source of pressurized gas;
  - a first gas outlet configured to supply pressurized gas to the pressure reservoir chamber of the first feed module;
  - a second gas outlet configured to supply pressurized gas to the pressure reservoir chamber of the second feed module,
  - a flow path configured for pressurized gas to flow from the gas inlet to the first and/or second gas outlet, the flow path comprising a flow path divider;
  - at least one pressure amplifier arranged in the flow path;
  - a first pressure control circuit configured to control pressure of pressurized gas delivered to the pressure reservoir chamber of the first feed module; and
  - a second pressure control circuit configured to control pressure of pressurized gas delivered to the pressure reservoir chamber of the second feed module.

2. The apparatus according to claim 1, wherein each of the first pressure control circuit and the second pressure control circuit of the pressure supply module comprises a valve and/or an electric pressure regulator arranged between the flow path divider and the respective first or second gas outlet.

3. The apparatus according to claim 2, wherein the pressure supply module further comprises a pressure reservoir chamber arranged in the flow path, the pressure reservoir chamber configured to hold pressurized gas.

4. The apparatus according to claim 3, wherein the pressure reservoir chamber is arranged upstream of the flow path divider.

5. The apparatus according to claim 3, wherein the pressure supply module comprises a further valve arranged in a flow path between the pressure reservoir chamber and the flow path divider.

6. The apparatus according to claim 5, wherein the pressure sensor is configured to sense pressure in the pressure reservoir chamber of the first feed module or the second feed module.

7. The apparatus according to claim 1, wherein the pressure supply module comprises two pressure amplifiers each respectively arranged downstream of the flow path divider of which a first pressure amplifier is fluidically connected with the first gas outlet and a second pressure amplifier is fluidically connected with the second gas outlet.

8. The apparatus according to claim 1, wherein the pressure supply module further comprises a flow path diversion configured to circumvent the at least one pressure amplifier, and wherein a check valve is arranged in the flow path diversion.

9. The apparatus according to claim 1, wherein the pressure reservoir chamber has a larger volume than the pressurizable substrate chamber with which the pressure reservoir chamber is in fluid communication.

10. The apparatus according to claim 9, wherein a ratio of a volume of the pressure reservoir chamber to a volume of the pressurizable substrate chamber is at least about 5:1.

11. The apparatus according to claim 1, wherein the open state and the closed state are the only states of the means for reversibly interrupting the fluid communication between the pressure reservoir chamber and the pressurizable substrate chamber.

12. The apparatus according to claim 1, wherein the means for reversibly interrupting the fluid communication between the pressure reservoir chamber and the pressurizable substrate chamber in its open state has a fluid path for the pressurized gas having a cross-sectional area of at least about 1 $mm^2$.

13. The apparatus according to claim 1, wherein the means for reversibly interrupting the fluid communication between the pressure reservoir chamber and the pressurizable substrate chamber is the sole means for controlling flow of pressurized gas between the pressure reservoir chamber and the pressurizable substrate chamber.

14. The apparatus according to claim 1, wherein the pressure amplifier is configured to increase pressure of pressurized gas received from the source of pressurized gas by at least 50%.

15. The apparatus according to claim 1, wherein the pressure supply module is configured to maintain a pressure of about 2 to 20 bar in the pressure reservoir chamber of the first feed module and/or the second feed module when the means for reversibly interrupting the fluid communication between the pressure reservoir chamber and the pressurizable substrate chamber is in the open state.

16. The apparatus according to claim 1, wherein an internal volume of the pressurizable substrate chamber of the first feed module is different from an internal volume of the pressurizable substrate chamber of the second feed module.

17. The apparatus according to claim 1, the apparatus further comprising a first counterpiece and a second counterpiece, wherein at least one of the first counterpiece or second counterpiece comprises a first cavity and a second cavity, and wherein the first counterpiece and second counterpiece are configured to be affixed to one another with one of the pressurizable substrate chambers comprising the first cavity and the other one of the pressurizable substrate chambers comprising the second cavity.

18. The apparatus according to claim 17, wherein at least two circumferential gaskets are respectively provided between the first counterpiece and the second counterpiece to separately seal each of the pressurizable substrate chambers, and wherein a frame configured to hold the flexible containers is sealed between the at least two circumferential gaskets.

19. The apparatus according to claim 17, wherein the pressurizable substrate chamber and the pressure reservoir chamber of the first feed module are in fluid connection via a first opening in the first counterpiece, the first opening being the first gas outlet of the pressure supply module; and wherein the pressurizable substrate chamber and the pressure reservoir chamber of the second feed module are in fluid connection via a second opening in the first counterpiece, the second opening being the second gas outlet of the pressure supply module.

20. A method of mixing a first liquid and a second liquid using the apparatus of claim 1, the method comprising the steps of:

providing the first flexible container holding the first liquid, the first flexible container being housed in the first pressurizable substrate chamber;

providing the second flexible container holding the second liquid, the second flexible container being housed in the second pressurizable substrate chamber;

providing the static mixer having
  a first inlet for receiving the first liquid,
  a second inlet for receiving the second liquid, and
  an outlet for discharging a third liquid that results from mixing the first liquid and the second liquid; and pressurizing the first pressurizable substrate chamber and the second pressurizable substrate chamber independently with pressurized gas that exerts pressure on an external surface of the first flexible container and the second flexible container, respectively, forcing the first and the second liquid through the static mixer to mix the first and the second liquid; and collecting the third liquid.

* * * * *